US008375034B2

(12) United States Patent  
Norton et al.

(10) Patent No.: US 8,375,034 B2  
(45) Date of Patent: Feb. 12, 2013

(54) AUTOMATICALLY SCHEDULE AND RE-SCHEDULE MEETINGS USING RESCHEDULE FACTORS FOR CONFLICTING CALENDAR EVENTS

(75) Inventors: Kenneth S. Norton, San Carlos, CA (US); David P. Marmaros, Mountain View, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 12/726,255

(22) Filed: Mar. 17, 2010

(65) Prior Publication Data

US 2011/0184943 A1 Jul. 28, 2011

Related U.S. Application Data

(60) Provisional application No. 61/298,903, filed on Jan. 27, 2010, provisional application No. 61/298,302, filed on Jan. 27, 2010, provisional application No. 61/298,900, filed on Jan. 27, 2010.

(51) Int. Cl.  
*G06F 7/00* (2006.01)

(52) U.S. Cl. ......... 707/748; 707/804; 707/805; 715/963

(58) Field of Classification Search ................. 707/803, 707/804, 805, 748, 749; 715/963  
See application file for complete search history.

(56) References Cited

U.S. PATENT DOCUMENTS

| | | | |
|---|---|---|---|
| 5,050,077 A | 9/1991 | Vincent | 364/401 |
| 7,343,312 B2 | 3/2008 | Capek et al. | |
| 7,984,287 B2 * | 7/2011 | Gopalakrishnan et al. | 713/100 |
| 2003/0149606 A1 | 8/2003 | Cragun et al. | 705/8 |
| 2005/0273372 A1 | 12/2005 | Bowne et al. | 705/5 |
| 2006/0271419 A1 | 11/2006 | O'Sullivan | |
| 2006/0293943 A1 | 12/2006 | Tischhauser et al. | |
| 2008/0133282 A1 | 6/2008 | Landar et al. | |
| 2008/0133515 A1 | 6/2008 | Chien et al. | |
| 2008/0140776 A1 * | 6/2008 | Horvitz | 709/204 |
| 2009/0006143 A1 | 1/2009 | Orttung et al. | 705/5 |
| 2009/0055234 A1 | 2/2009 | Li et al. | 705/8 |
| 2009/0089342 A1 | 4/2009 | Runstedler et al. | |
| 2009/0112984 A1 | 4/2009 | Anglin et al. | 709/204 |
| 2009/0287629 A1 | 11/2009 | Gabriel et al. | |
| 2009/0327227 A1 | 12/2009 | Chakra et al. | |
| 2010/0088143 A1 | 4/2010 | Platt et al. | |
| 2010/0274855 A1 | 10/2010 | Wassingbo | |

OTHER PUBLICATIONS

International Search Report and Written Opinion for PCT/US11/20763 dated May 18, 2011, 9 pgs.

\* cited by examiner

*Primary Examiner* — Vincent Boccio  
(74) *Attorney, Agent, or Firm* — Morgan, Lewis & Bockius LLP

(57) ABSTRACT

A method for scheduling calendar events includes receiving a search request with a plurality of constraints, searching the calendaring system databases to obtain a set of candidate calendar events that meet at least some of the constraints, calculating event reschedule factors for each candidate calendar event for which at least one participant has a conflicting calendar event, ranking the set of candidate calendar events based in part of the event reschedule factors, and preparing them for presentation. In various embodiments and circumstances, event reschedule factors correspond to one or more of: the ease of rescheduling a conflicting calendar event, an ease of overwriting a conflicting calendar event, the response status of the participants, the number of participants in the conflicting calendar event.

30 Claims, 15 Drawing Sheets

AUTOMATICALLY SCHEDULE AND RE-SCHEDULE MEETINGS USING RESCHEDULE FACTORS FOR CONFLICTING CALENDAR EVENTS

This application claims the benefit of U.S. Provisional Application No. 61/298,900, filed Jan. 27, 2010, entitled "Automatically Schedule and Re-schedule Meetings through Search Interface," U.S. Provisional Application No. 61/298,902, filed Jan. 27, 2010, entitled "Automatically Schedule and Re-schedule Meetings using Reschedule Factors for Conflicting Calendar Events," and U.S. Provisional Application No. 61/298,903, filed Jan. 27, 2010, entitled "Automatically Determine Suggested Meeting Locations Based on Previously Booked Calendar Events."

This application is related to U.S. patent application Ser. No. 12/695,142, filed Jan. 27, 2010, entitled "Just-In-Time Conference Room Scheduling," which application is incorporated by reference herein in its entirety.

This application is related to U.S. patent application Ser. No. 12/726,241, filed Mar. 17, 2010, entitled "Automatically Schedule and Re-schedule Meetings through Search Interface," which application is incorporated by reference herein in its entirety.

This application is related to U.S. patent application Ser. No. 12/726,266, filed Mar. 17, 2010, entitled "Automatically Determine Suggested Meeting Locations Based on Previously Booked Calendar Events," which application is incorporated by reference herein in its entirety.

TECHNICAL FIELD

The disclosed embodiments relate generally to electronic calendars. More particularly, the disclosed embodiments relate to methods, systems, and graphical user interfaces for scheduling meetings with a plurality of constraints through a search interface utilizing reschedule factors.

BACKGROUND

Electronic calendars are increasingly used to organize our lives. Such calendars are accessed from both desktop computers and portable computing devices (e.g., laptop computers, personal digital assistants (PDAs), mobile phones, and wearable computers).

One problem with calendaring is that a plurality of constraints should be met, such as finding an open time slot for all of the participants, and finding a meeting room that is large enough, includes any needed equipment, and is located generally nearby most of the participants. Often no meeting time and location exists within a beneficial schedule range which meets all of the constraints, so certain concessions must be made on particular constraints. For example, a meeting organizer may manually determine which participants are critical and which participants are optional or can be replaced by other participants. Meeting even most of the constraints often involves manually hunting for open time slots, available conference rooms, and manually determining the time slots during which the most critical participants and a desirable conference room are available. Therefore, there is a need for an automated search system for assisting a user in scheduling and re-scheduling meetings with a plurality of constraints.

SUMMARY

A number of embodiments (e.g., of server systems, client systems or devices, and methods of operating such systems or devices) that overcome the limitations and disadvantages described above are presented in more detail below. These embodiments provide methods, systems, and computer program products for determining suggested meeting locations based on previously booked calendar events.

As described in more detail below, one aspect of the invention is a computer implemented method that schedules calendar events. A calendar search request to schedule a calendar event is received from a user. The request includes a plurality of constraints including one or more participants and a time of meeting constraint. One or more databases in a calendaring system are searched to obtain a set of candidate calendar events that meet at least a subset of the plurality of constraints. One or more event reschedule factors are calculated. They include an event reschedule factor for each candidate calendar event for which at least one participant has a conflicting calendar event, based on one or more metrics corresponding to the conflicting calendar event. The set of candidate calendar events is ranked based on the one or more event reschedule factors. Then the ranked set of candidate calendar events is prepared for presentation. Each candidate calendar event includes a specified start time and information corresponding to available participants.

Another aspect of the invention includes a calendar system for scheduling calendar events. The system includes one or more central processing units for executing programs, and memory storing one or more programs be executed by the one or more central processing units. The one or more programs comprise instructions for scheduling calendar events as follows. A calendar search request to schedule a calendar event is received from a user. The request includes a plurality of constraints including one or more participants and a time of meeting constraint. One or more databases in a calendaring system are searched to obtain a set of candidate calendar events that meet at least a subset of the plurality of constraints. One or more event reschedule factors are calculated. They include an event reschedule factor for each candidate calendar event for which at least one participant has a conflicting calendar event, based on one or more metrics corresponding to the conflicting calendar event. The set of candidate calendar events is ranked based on the one or more event reschedule factors. Then the ranked set of candidate calendar events is prepared for presentation. Each candidate calendar event includes a specified start time and information corresponding to available participants.

Yet another aspect of the invention is a computer readable storage medium storing one or more programs configured for execution by a computer. The computer readable storage medium includes program instructions for scheduling calendar events as follows. A calendar search request to schedule a calendar event is received from a user. The request includes a plurality of constraints including one or more participants and a time of meeting constraint. One or more databases in a calendaring system are searched to obtain a set of candidate calendar events that meet at least a subset of the plurality of constraints. One or more event reschedule factors are calculated. They include an event reschedule factor for each candidate calendar event for which at least one participant has a conflicting calendar event, based on one or more metrics corresponding to the conflicting calendar event. The set of candidate calendar events is ranked based on the one or more event reschedule factors. Then the ranked set of candidate calendar events is prepared for presentation. Each candidate calendar event includes a specified start time and information corresponding to available participants.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings.

Like reference numerals refer to corresponding parts throughout the drawings.

DESCRIPTION OF EMBODIMENTS

Figure 1:
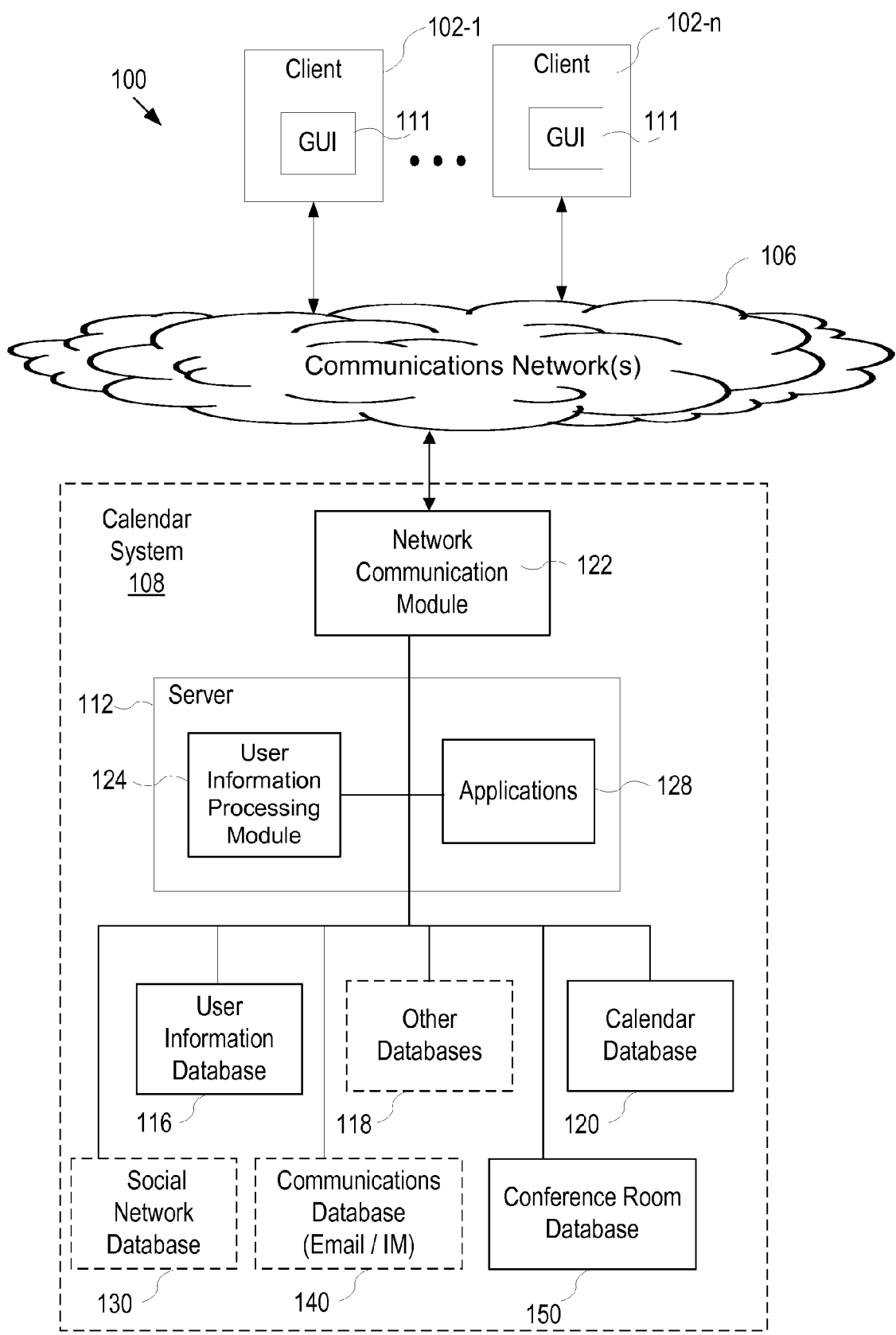
FIG. 1 is a block diagram illustrating an exemplary distributed computer system, in accordance with some embodiments.

Methods and systems for scheduling a calendar event in an electronic calendar are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

It will also be understood that, although the terms first, second, etc. may be used herein to describe various elements, these elements should not be limited by these terms. These terms are only used to distinguish one element from another.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "requester" is used to mean a person scheduling, initiating, or organizing a meeting.

As used herein, the terms "meeting" and "event" are used interchangeably to mean a calendar event involving one or more participants. As used herein, "meetings" can include both single-participant meetings (e.g., a person reserving a conference room for a video or audio conference), and multiple-participant meetings.

As used herein, the terms "invitee" and "potential participant" have been used interchangeably to mean people who have been invited to an event, irrespective of whether they have accepted, declined, or not yet responded to the invitation. As used herein, the term "required attendee" is used to mean invitees whose attendance a requester has identified as required, irrespective of whether they have accepted, declined, or not yet responded to the invitation. As used herein, the term "optional attendee" has been used to mean invitees whose attendance a requester has identified as optional, irrespective of whether they have accepted, declined, or not yet responded to the invitation.

As used herein, the term "conference room amenities" is used to mean furnishings, equipment, and/or functions in conference rooms, such as one or more of: tables, chairs, desks, podium, blackboard, whiteboard, electronic whiteboard, overhead projector, slide projector, video monitor, video camera, video conferencing equipment, television, video cassette recorder (VCR), digital video disc (DVD) player, compact disc (CD) player, tape player, tape recorder, computer, network lines, phone, fax, sound system, flip charts, telecommunication equipment, window, and access to a wireless network.

As used herein, the term "time-of-meeting constraints" is used to mean meeting start date, start time, end date, end time, meeting duration, and/or schedule range.

As used herein, the term "plurality of constraints" is used to mean a plurality of the constraints mentioned above or discussed below. For example, a plurality of constraints could include at least one potential participant, a time-of-meeting constraint, conference room amenities, a schedule range, a requested location, a preferred proximity to a potential participant, a participant's base location, and a participant's working hours.

FIG. 1 is a block diagram illustrating an exemplary distributed computer system 100, according to certain embodiments of the invention. System 100 may include one or more client computers 102, a communications network 106, and a calendar system 108.

Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s). The clients 102 are described in greater detail below with reference to FIG. 3. Client 102 includes a graphical user interface (GUI) 111. As described in more detail below, the GUI 111 is used to display a portion of a calendar and the search interface for scheduling calendar events. Client 102 is connected to calendar system 108 via communications network 106.

Calendar system 108 includes one or more servers, such as server 112, connected to the communications network 106 via network communication module 122. Calendar system 108 includes a user information database 116, a calendar database 120, and a conference room database 150. Optionally, calendar system 108 also includes or has access to one or more other databases, such as one or more social network databases 130, communications databases 140, and/or additional databases 118. Server 112 includes a user information processing module 124 and applications 128. The network communications module 122 connects server 112 to the communication network 106 and enables the receipt of communications from the communication network 106 and the provision of communications to the communication network 106 bound for a respective client 102 or other destinations. Server 112 communicates with databases internal to the calendar system 108, such as user information database 116, calendar database 120, conference room database 150, and optionally social network databases 130, communications databases 140, and other databases 118, if any. These internal communications may be handled by network communication module 122, by a local area network, by internal communication busses, or by any other appropriate mechanism or combination of mechanisms.

Server 112 communicates with clients 102 via network communication module 122 and communication network(s) 106. In the cases where the calendar system includes multiple servers, each server, such as server 112, is coupled to a communications network 106 via a network communication module 122. The communications network 106 may be the Internet, but may also be any local area network (LAN), wide area network (WAN), metropolitan area network, or a combination of such networks. In some embodiments, server 112 is a Web server that manages electronic calendars using appropriate communication protocols. Alternatively, if server 112 is used within an intranet, it may be an intranet server.

Applications 128 include application programs used for managing an online calendar system. The user information processing module 124 assists in accessing, updating and modifying user information databases 116, the calendar database 120, the conference room database 150, and any other databases in the system that are used. The applications 128 include a calendar search program, described in more detail herein in reference to FIG. 2.

Figure 5:
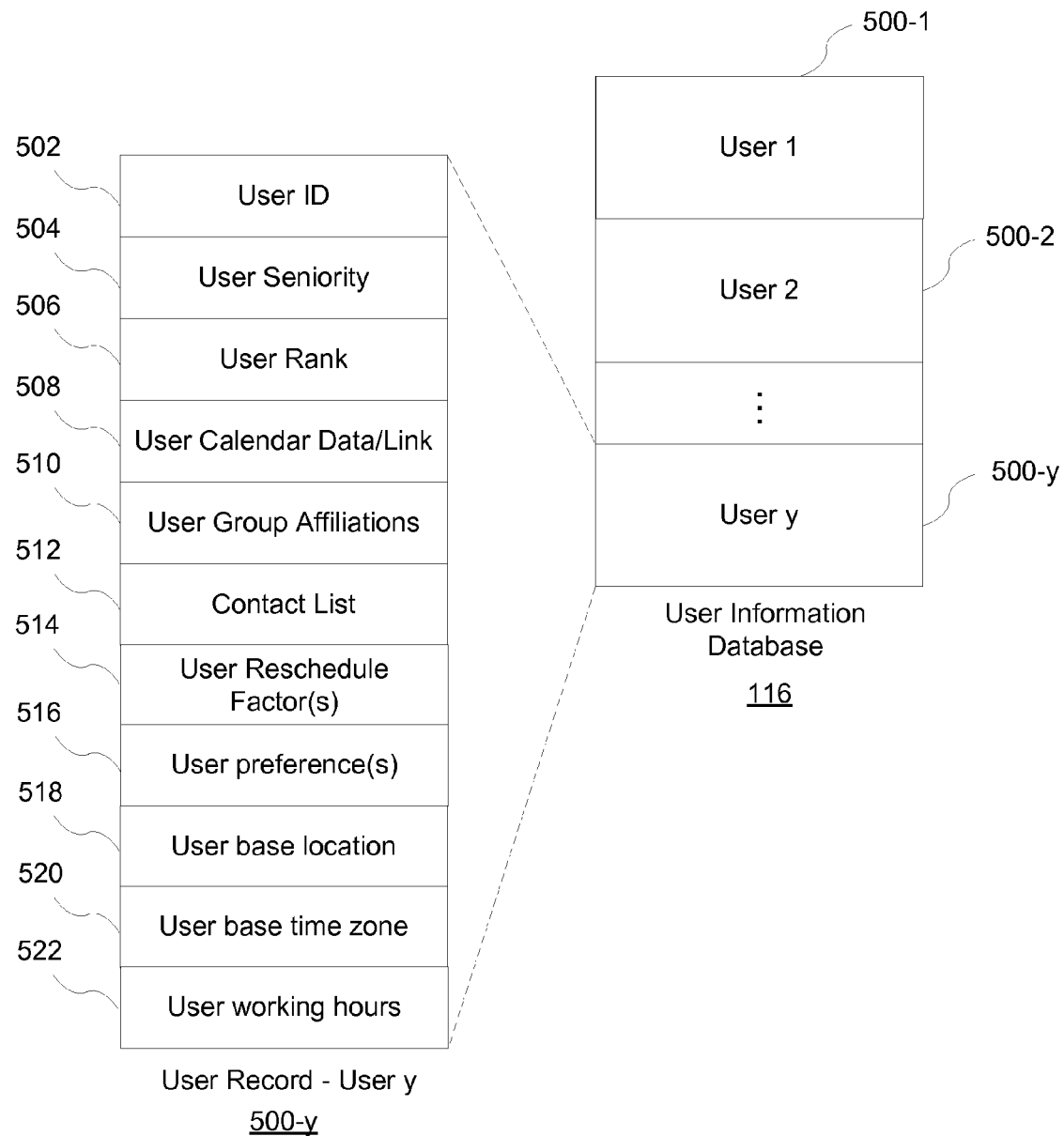
FIG. 5 is a block diagram illustrating an exemplary user information database and an exemplary user record in the user information database, in accordance with some embodiments.

The user information database 116 stores information (e.g., metadata) associated with the users of the calendar system 108, including, for example, two or more of: user preferences, base location, base time zone, working hours, and reschedule factors as described in greater detail herein in reference to FIG. 5. Alternately, some of the aforementioned information associated with users is determined when needed, based on historical calendar records and optionally other information sources as well, and is not durably stored in the user information database 116.

Figure 4:
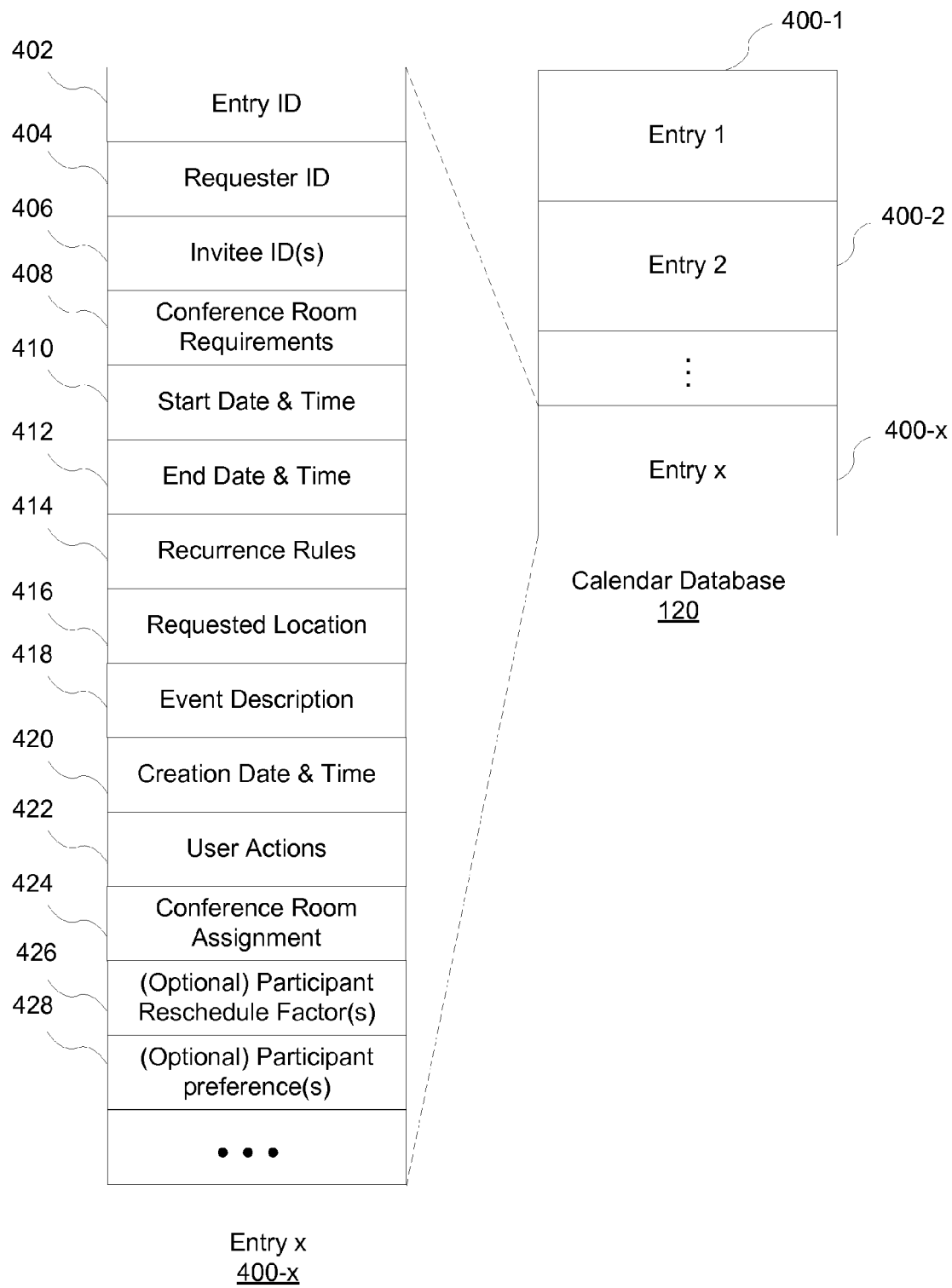
FIG. 4 is a block diagram illustrating an exemplary calendar database and an exemplary event record in the calendar database, in accordance with some embodiments.

The calendar database 120 may store information (e.g., metadata) concerning individual calendar entries such as the start date and time, duration, recurrence rules, location, and optionally, additional information such as conference room requirements and user actions, as discussed in detail herein in reference to FIG. 4. Some calendar entries will have only a subset of the aforementioned information items. The calendar database 120 may also store various types of calendars as well as data from various calendars.

The conference room database 150 stores information (e.g., metadata) concerning various types of conference rooms (e.g., location, such as city, campus, campus sub-region, building, floor, and/or building sub-region); and optionally includes additional information such as one or more of: conference room capacity or size; conference room amenities (see definition provided above); and scheduling information including the start and end time for meetings scheduled in the conference room. In some other embodiments, conference room database 150 also stores information about proximity to other facilities, such as restrooms, water fountains, vending machines, elevators, and emergency exits.

The social network database 130, if included in or accessed by the calendar system 108, stores various social networking events and profile information. It also stores information about how its various members (who are potential participants) are connected to one another.

The communications databases 140, if included in or accessed by the calendar system 108, store various communications between its members. Communications include one or more of: email messages, chat messages, phone messages, video conferences, etc. The communications databases 140 may optionally store metrics derived from historical communications, such as one or more affinity metrics that are indicative of the number, frequency and/or recency of communications between a user and various contacts in the user's contact list.

As discussed in more detail below, server 112 is configured to manage certain aspects of calendar system 108, including transmitting data to a respective client 102 for assisting a requestor in scheduling and re-scheduling meetings including a plurality of constraints. Optionally, the calendar system 108 is part of a larger calendaring service provided to a community of users (e.g. the employees of a company, members of an organization or group, the users of a facility, etc.)

In some embodiments, fewer and/or additional modules, functions or databases are included in calendar system 108 and server 112. The modules shown in calendar system 108 and server 112 represent functions performed in certain embodiments.

Notwithstanding the discrete blocks in FIG. 1, the figure is intended to be a functional description of some embodiments of the invention rather than a structural description of functional elements in the embodiments. One of ordinary skill in the art will recognize that an actual implementation might have the functional elements grouped or split among various components. For example, user information databases 116 may be part of or stored within server 112. In some embodiments, user information databases 116 may be implemented using one or more servers whose primary function is to store and process user information. Similarly, calendar database 120 may be implemented on one or more servers. The actual number of servers used to implement a calendar system 108 and how features are allocated among them will vary from one implementation to another, and may depend in part on the amount of data traffic that the system must handle during peak usage periods as well as during average usage periods, and the amount of data stored by the calendar system. Moreover, one or more of the blocks in FIG. 1 may be implemented on one or more servers designed to provide the described functionality. Although the description herein refers to certain features implemented in client 102 and certain features implemented in server 112, the embodiments of the invention are not limited to such distinctions. For example, features described herein as being part of server 112 can be implemented in whole or in part in client 102, and vice versa.

Figure 2:
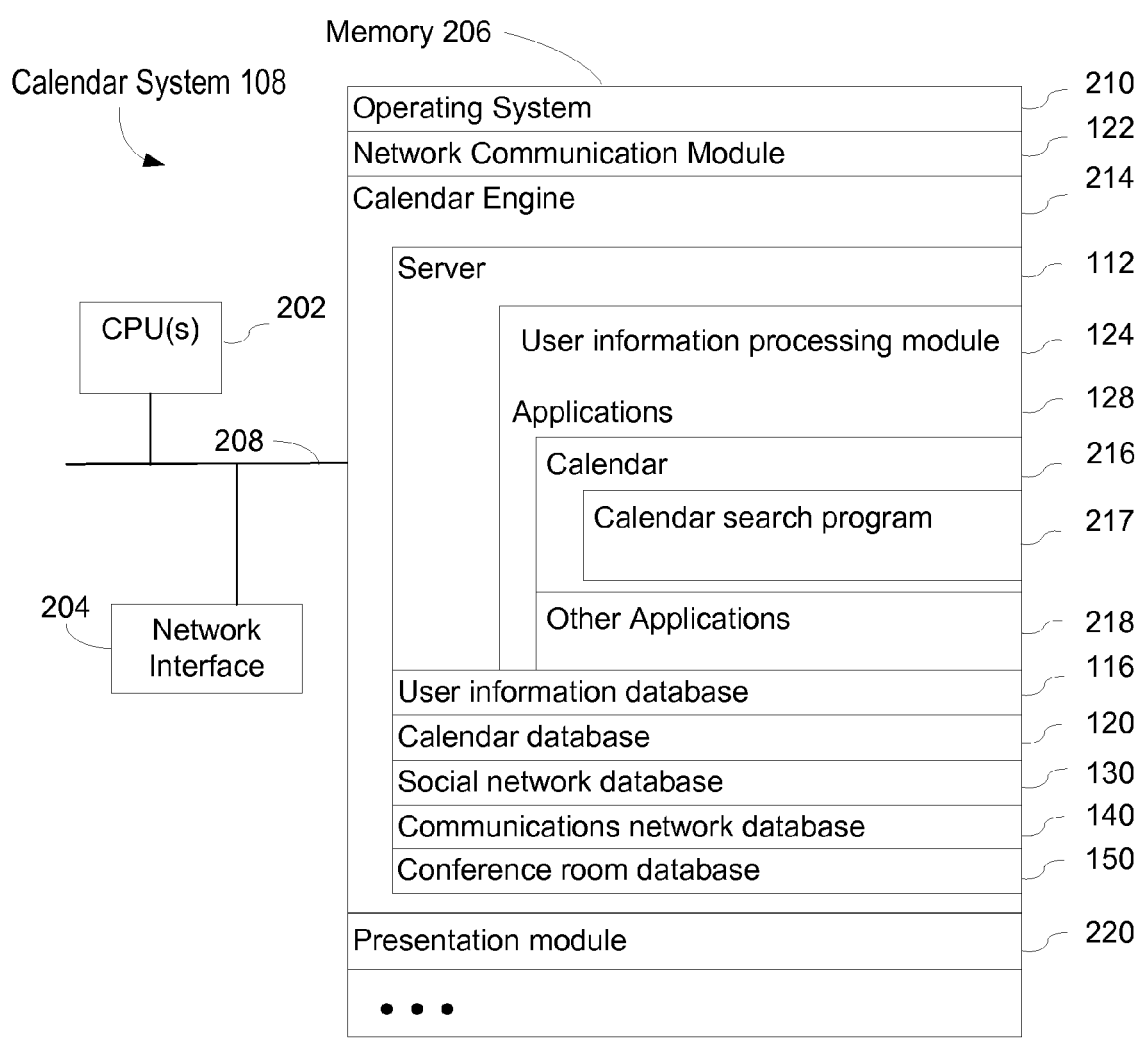
FIG. 2 is a block diagram illustrating an exemplary calendar server system, in accordance with some embodiments.

FIG. 2 is a block diagram illustrating calendar system 108 in accordance some embodiments of the present invention. The calendar system 108 includes one or more processing units (CPUs) 202, one or more network or other communications interfaces 204, memory 206, and one or more communication buses 208 for interconnecting these components. The communication buses 208 may include circuitry (sometimes called a chipset) that interconnects and controls communications between system components. The calendar system 108 optionally includes a user interface (not shown) (e.g., a user interface having a display device, a keyboard, and a mouse or other pointing device), but more typically the calendar system 108 is controlled from and accessed by various client systems.

Memory 206 of calendar system 108 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a computer readable storage medium. In some embodiments, memory 206 or the computer readable storage medium of memory 206 stores the following programs, modules and data structures, or a subset thereof:

- Operating System 210 that includes procedures for handling various basic system services and for performing hardware dependent tasks;
- Network Communication Module (or instructions) 122 that is used for connecting the calendar system 108 to other computers (e.g., clients 102) via the one or more communications Network Interfaces 204 (wired or wireless) and one or more communications networks 106 (FIG. 1), such as the Internet, other wide area networks, local area networks, metropolitan area networks, and so on;
- Calendar Engine 214 that receives calendar-related requests from and provides responses to clients 102; and
- Presentation module 220 that formats the results from Calendar Engine 214 for display.

Calendar Engine 214 may include the following programs, modules and data structures, or a subset or superset thereof:

- A server 112 for managing certain aspects of calendar system 108 including a user information processing module 124, and applications 128. Applications 128 include a calendar application 216 for performing the primary functions of an online calendar system; calendar application 216 includes a calendar search program 217 for receiving a plurality of constraints from a requestor, identifying preferences associated with at least some of the participants, and preparing for presentation candidate calendar events meeting at least some of the constraints and preferences as will be explained in more detail with reference to FIG. 10. The information used by calendar search program 217 is obtained from user information database 116, calendar database 120, and/or conference room database 150. Optionally, the information used by calendar search program 217 also includes information obtained from one or more of social network database 130, communications databases 140, and other databases 118. Server 112 optionally includes other applications 218;
- User information database 116 that stores information records for users;
- Calendar database 120 that stores calendar entries, and possibly other calendar data as well (e.g., generated participant reschedule factors and participant preferences associated with participants in a calendar event, etc.);
- Social network database 130 that includes group affiliations and network connections between users;
- Communications database 140 that includes email, instant messaging (IM) and/or other communications records of communications between users of one or more communications systems; and
- Conference room database 150 that includes conference room records including, for a respective conference, information regarding the location and size or capacity of the conference room, and optionally including additional information such as the amenities of the conference room, and scheduling information for the conference room. Alternately, scheduling information for the conference room may be obtained from calendar database 120.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 or the computer readable storage medium of memory 206 may store a subset of the modules and data structures identified above. Furthermore, memory 206 or the computer readable storage medium of memory 206 may store additional modules and data structures not described above.

Although FIG. 2 shows calendar system 108 as a number of discrete items, FIG. 2 is intended more as a functional description of the various features which may be present in calendar system 108 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in calendar system 108 and how features are allocated among them will vary from one implementation to another, and may depend in part on the amount of data traffic that the system must handle during peak usage periods as well as during average usage periods.

Figure 3:
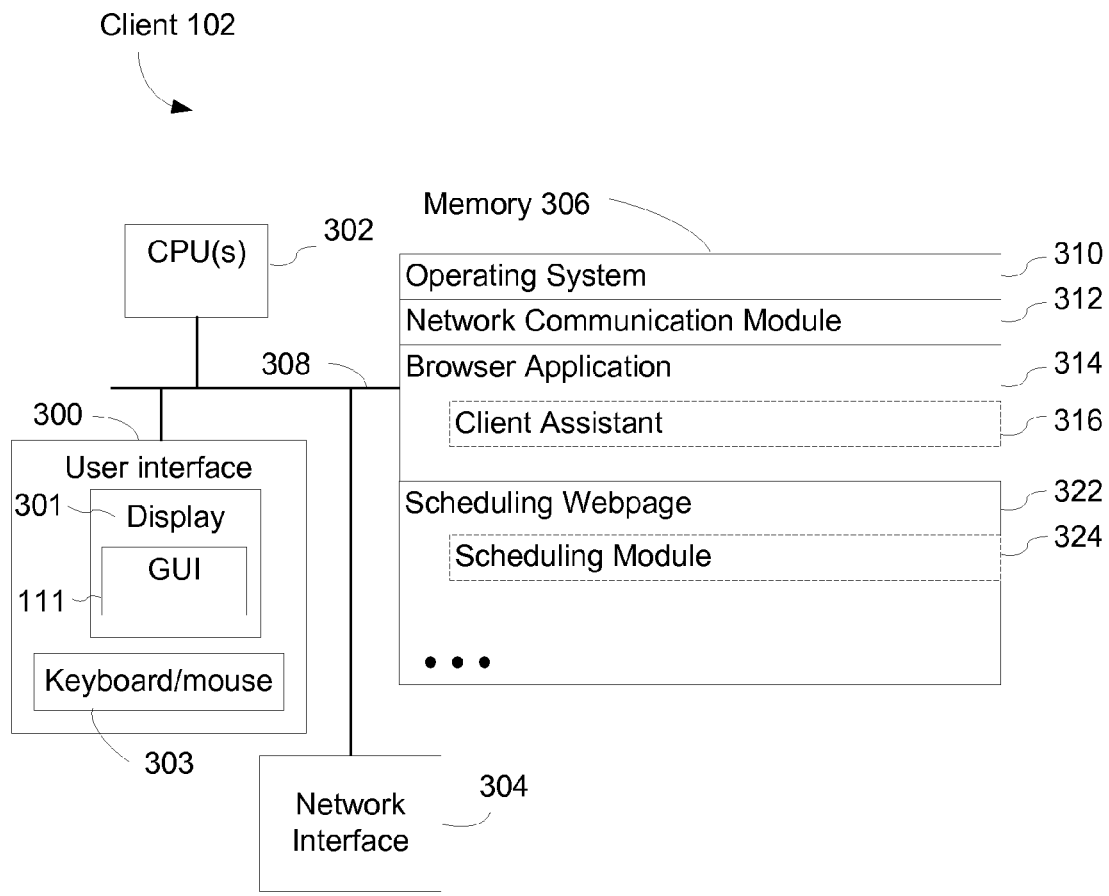
FIG. 3 is a block diagram illustrating an exemplary client, in accordance with some embodiments.

FIG. 3 is a block diagram illustrating an embodiment of a client 102, also called a client system or client device, in accordance with some embodiments. The client 102 shown in this figure is configured for use by a subscriber (also herein called "the user") of the calendar system 108. The client includes a graphical user interface 300, which typically includes a display device 301, and one or more input devices 303 such as a keyboard and a mouse or other pointing device (e.g., a stylus or user's finger on a touch-sensitive surface or touch-sensitive display). As noted above, client 102 includes a graphical user interface (GUI) 111, which is displayed on the display device 301. Client 102 typically includes one or more processing units (CPUs) 302, one or more network or other network communications interfaces 304, memory 306, and one or more communication buses 308 for interconnecting these components. The communication buses 308 may include circuitry (sometimes called a chipset) that interconnects and controls communications between system components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, comprises a computer readable storage medium. In some embodiments, memory 306 or the computer readable storage medium of memory 306 stores the following programs, modules and data structures, or a subset thereof:

- Operating System 310 that includes procedures for handling various basic system services and for performing hardware dependent tasks;
- Network Communication Module (or instructions) 312 that is used for connecting client 102 to other computers (e.g., calendar system 108, other clients 102) via the one or more communications Network Interfaces 304 (wired or wireless) and one or more communication networks 106 (FIG. 1), such as the Internet, other wide area networks, local area networks, metropolitan area networks, and so on;
- Browser Application 314; optionally, the browser application 314 or an extension, plug-in or toolbar of the browser application includes a client assistant 316 that handles data formatting and/or management tasks, at least some of which would otherwise be handled by presentation module 220 (FIG. 2); and
- Scheduling Webpage 322, which is a webpage received from the calendar system 108, for receiving scheduling-related input from a computer user (e.g., a request to schedule an event or to retrieve schedule data) and for presenting schedule search data in GUI 111; webpage 322 optionally includes an embedded Scheduling Module 324, for receiving scheduling-related input from a computer user and for formatting schedule data for display in GUI 111.

In some embodiments, the client 102 may be a "thin client," which includes a browser application 314 that displays the conference room scheduling webpage 322 received from the calendar system 108. In this embodiment, the client 102 only displays the scheduling webpage, and executes programs, if any, embedded within the scheduling webpage 322, but includes little if any additional software. In some embodiments, programs embedded within the scheduling webpage 322 format schedule data for display. In thin client embodiments, schedule related processing other than user data input and schedule data display are handled by the calendar system 108.

FIG. 4 is a block diagram illustrating an exemplary calendar database 120 and an exemplary calendar entry record 400-$x$ in accordance with some embodiments of the invention. Calendar database 120 stores calendar entry records 400, for example entry 1 (400-1) through entry x (400-$x$), where x represents the number of entries (or the number of entries for a respective user, or the number of entries in a local calendar database at a client 102).

A calendar entry (e.g., entry x 400-$x$) includes the following data, or a subset or superset thereof for a calendar event (which can be either a historical calendar event, which occurred in the past, or a scheduled calendar event, to occur in the future):

- Entry ID 402 that uniquely identifies a particular calendar entry, corresponding to a particular calendar event (e.g., an n-bit binary number);
- Requestor ID 404 that identifies the requestor (or event organizer) associated with the calendar entry (e.g., n-bit binary number(s) or e-mail addresses);
- Invitee ID(s) 406 that identifies the invitee(s) associated with the calendar entry (e.g., n-bit binary number(s) or e-mail addresses); the information in this field optionally identifies required attendees, optional attendees, and guests;
- Conference room requirements 408, if any (e.g., requested amenities for the conference room);
- Start date and/or start time 410 of the event;
- End date and/or end time 412 of the event;
- Recurrence rules 414 (if any) for the event (e.g., whether the meeting occurs only once, daily, weekly, every other week, monthly, yearly, etc. and the end date for the recurrence);
- Location 416 (e.g., building, campus, city, address, etc.) of the event;
- Event description 418 (e.g., title; description details; color coding; icon, if any, added to the event; event creator specified event importance, etc.);
- Creation date and time 420;
- User actions 422 (if any) with respect to the event, such as: information indicating which invitees of an event accepted, declined, or tentatively accepted an invitation to the event; attending or not attending the event (if such information is available); user feedback, such as a proposal to change the meeting date or time, replies, comments, or deletions; user importance indicators for a respective event, such as marking the event as important or movable;
- Conference room assignment 424 that identifies the conference room assigned to a respective conference room scheduling request;
- Optional calculated participant reschedule factors 426 for some or all of the participants of the event; indicating how difficult re-scheduling the event would be for a particular participant, taking into account factors such as how busy the participant is, the importance and moveability of the participant's other scheduled events, the participant's importance etc; and
- Optional participant preferences 428 for some or all of the participants; including the participant's normal working hours, time zone, normal meeting time hours, normal meeting locations, etc.

In some embodiments, a separate calendar database is maintained for each user.

FIG. 5 is a block diagram illustrating an exemplary user information database 116 and an exemplary user record 500-$y$ for a particular user in accordance with one embodiment of the invention. The user information database 116 stores user records 500, for example user record (User 1) 500-1 through user record (User y) 500-$y$, where y may represent the number of users.

A user record (e.g., User Record 500-$y$) may include the following data, or a subset or superset thereof:

User ID 502 that uniquely identifies a particular user (e.g., an n-bit binary number or an email address) and the corresponding user record 500;

User seniority 504, as measured by the user's position in a company or organization; optionally, user seniority 504 or rank 506 may be obtained from another database, and thus not durably stored in user record 500;

User rank 506, which is another optional measure of the user's importance or rank in a community of users;

User calendar information data/link 508, including future events to which the user has been invited, event invitations the user has accepted, has declined, and user calendar history such as events that the user has attended; optionally, user calendar information is not stored in user record 500, and instead is obtained by querying the calendar database 120;

User group affiliations 510; optionally, user group affiliations are not stored in user record 500, and instead are obtained by querying one or more other databases;

Contact list 512, which contains contact information for the user (i.e., information about other users or persons known to the user); alternatively, this field of the user record 500 may contain a link to the user's contact list (e.g., in a contact application, or email or other communications application);

User reschedule factors 514 indicating the difficulty of rescheduling events for the user. In some embodiments a user has one reschedule factor which indicates generally how difficult scheduling any event is for the user. In other embodiments a reschedule factor 514 is calculated individually for each calendar event to which the user is invited, and indicates how difficult re-scheduling that event would be for a particular participant. The reschedule factors take into account factors such as how busy the participant is (indicated for example by how many meetings the participant is scheduled to attend), the importance and moveablity of the participant's other scheduled events, the participant's organizational status (rank and or seniority), likelihood of attending meetings as an optional attendee, whether another user could attend in the user's place, etc. Optionally, user reschedule factors 514 are not stored in user record 500, and instead are dynamically generated by calendar application 216 when needed;

User preferences 516, which take into account potential meeting constraints such as working hours, preferred conference rooms, preferences for (or against) contiguous blocks of meetings, preferred conference room amenities etc.; optionally, user preferences 516 are not stored in user record 500, and instead are dynamically determined by calendar application 216 when needed;

User base location 518. In some embodiments, the user base location 518 is explicitly provided by the user. In other embodiments, the user base location 518 is inferred from the majority of scheduled events over a set time frame, such as a week, a month, or a year. Optionally, user base location 518 is not stored in user record 500, and instead is dynamically determined by calendar application 216 when needed;

User base time zone 520. In some embodiments, the user base time zone 520 is explicitly provided by the user. In other embodiments, the user base time zone 520 is inferred from the majority of scheduled events over a set time frame, such as a week, a month, or a year. optionally, user base time zone 520 is not stored in user record 500, and instead is dynamically determined by calendar application 216 when needed; and User working hours 522. In some embodiments, the user working hours 522 are explicitly provided by the user. In other embodiments, the working hours 522 are inferred from the majority of scheduled events over a set time frame, such as a week, a month, or a year. In some embodiments, the strictness of the working hours is also calculated, which indicates how likely scheduled events occur outside of the working hours. Optionally, user working hours 522 are not stored in user record 500, and instead are dynamically determined by calendar application 216 when needed.

Figure 6:
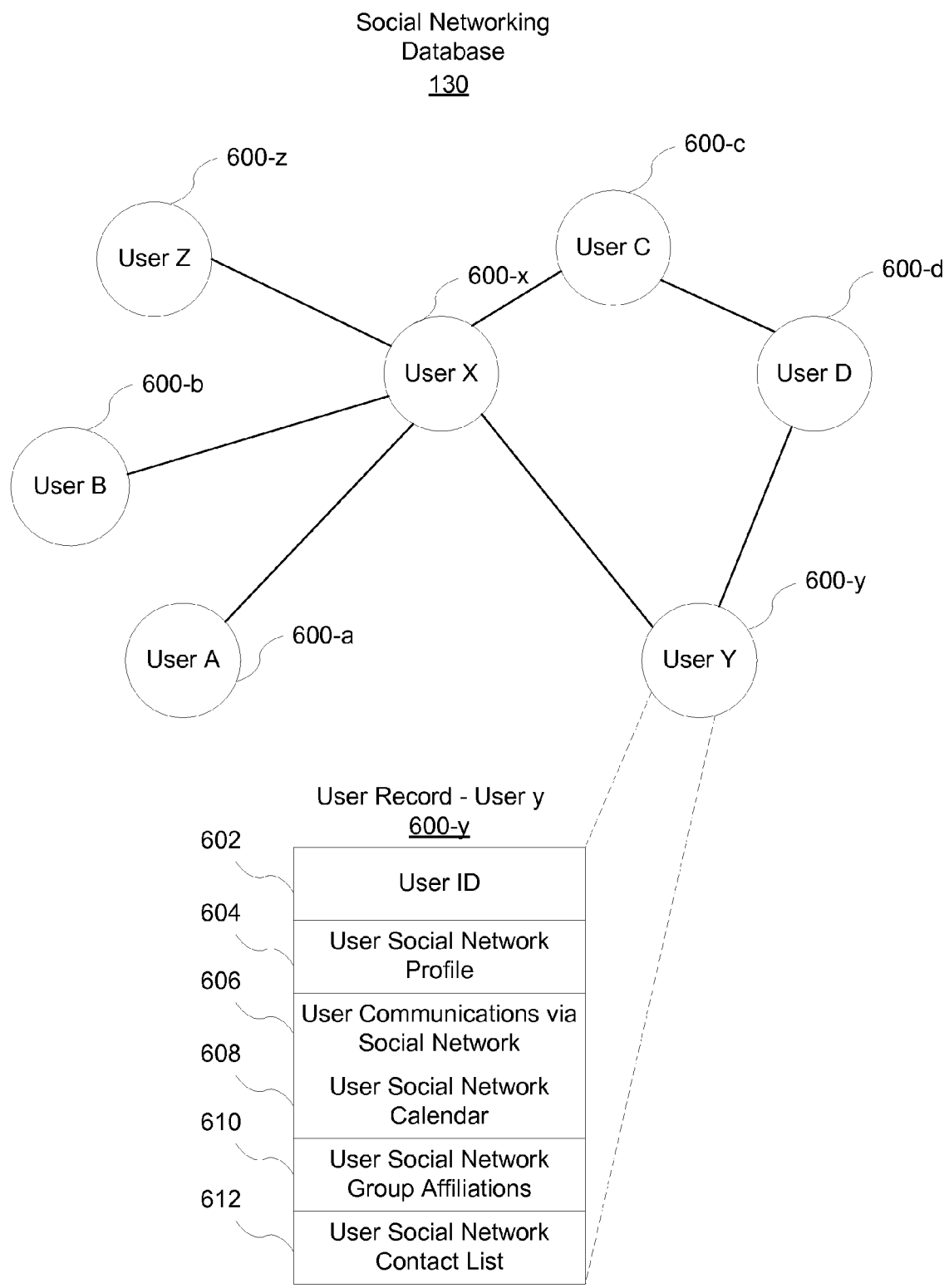
FIG. 6 is a block diagram illustrating exemplary relationships in a social networking database and an exemplary user record in the social network database, in accordance with some embodiments.

FIG. 6 is a block diagram illustrating an exemplary social network database 130 and an exemplary user record 600-$y$ for a particular user in accordance with one embodiment of the invention. The social network database 130 stores social connections between the users of the social network, these interconnections are shown as nodes with inter-connective links in FIG. 6. The interconnections between users can provide an indication of which users are in close association with one another such as a part of the same working group. For purposes of re-schedule factor calculations, meetings with close associates may be considered easier to re-schedule. The social network database 130 also stores records 600 for each of the people that use the social network database 130, for example user record (Person A) 600-A through user record (Person Y) 600-$y$, where y may represent the number of users.

A user record (e.g., User Record 600-$y$) within the social network database 130 may include the following data, or a subset or superset thereof:

User ID 602 that uniquely identifies a particular user (e.g., an n-bit binary number or an email address);

User social network profile 604 that includes contact information and social network related preferences for the user;

User history of communications 606 conducted with other social network users;

(Optional) User social network calendar 608, separate from the calendar of the calendar database 120 including the events that the user has been invited to, has accepted, has declined, and has attended;

User social network group affiliations 610; and

User social network contact list 512, which contains contact information for the contacts that the user has through the social network which may be a subset or superset of contact information the user maintains in the user database 116 and communications databases 140. Optionally, the user record 600-$y$ does not include user social network contact list 512, and instead contact list information for the user is stored elsewhere, such as in a separate contacts application/database, or in a contacts database for a communications application.

Figure 7:
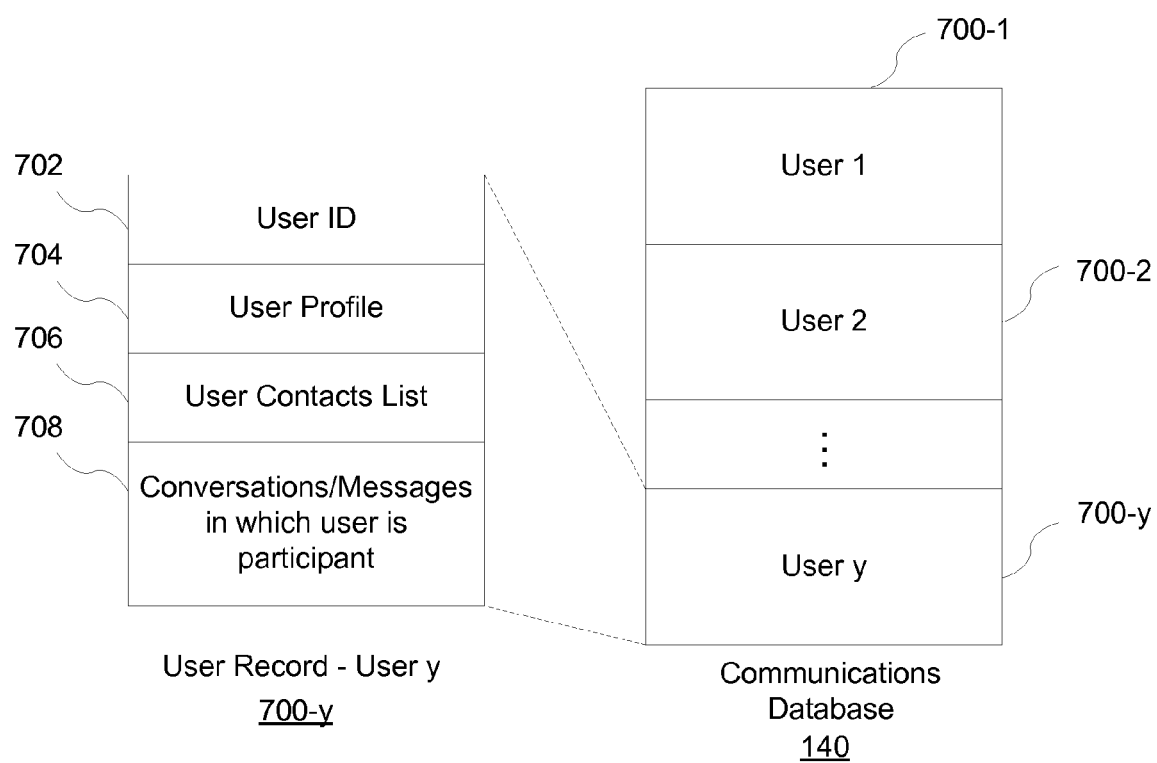
FIG. 7 is a block diagram illustrating an exemplary communications database and an exemplary user record in the communications database, in accordance with some embodiments.

FIG. 7 is a block diagram illustrating an exemplary communications database 140 and an exemplary user record 700-$y$ for a particular user in accordance with one embodiment of the invention. The communications database 140 stores user records 700, for example user record (User 1)

700-1 through user record (User y) 700-*y*, where y may represent the number of users. As discussed above, communications database 140 is typically associated with a communications application separate from the calendar application 216. Optionally, communications database 140 is located on a different server or set of servers from the calendar database 120.

A user record (e.g., User Record 700-*y*) may include the following data, or a subset or superset thereof:

User ID 702 that uniquely identifies a particular user (e.g., an n-bit binary number or an email address) and the corresponding user record 700;

User's profile 704 that includes contact information and communication network preferences for the user (the preferences are individualized for the communications mediums such as E-mail, IM/Chat, teleconferencing, video conferencing, SMS, etc.);

User contact list 706, which contains contact information for the contacts that the user communicates with through one or more communications mediums such as E-mail, IM/Chat, teleconferencing, video conferencing, SMS, etc., which may be a subset or superset of contact information the user maintains in the user database 116 and social network database 130; and Conversations or messages 708 in which the user is a participant.

Figure 8:
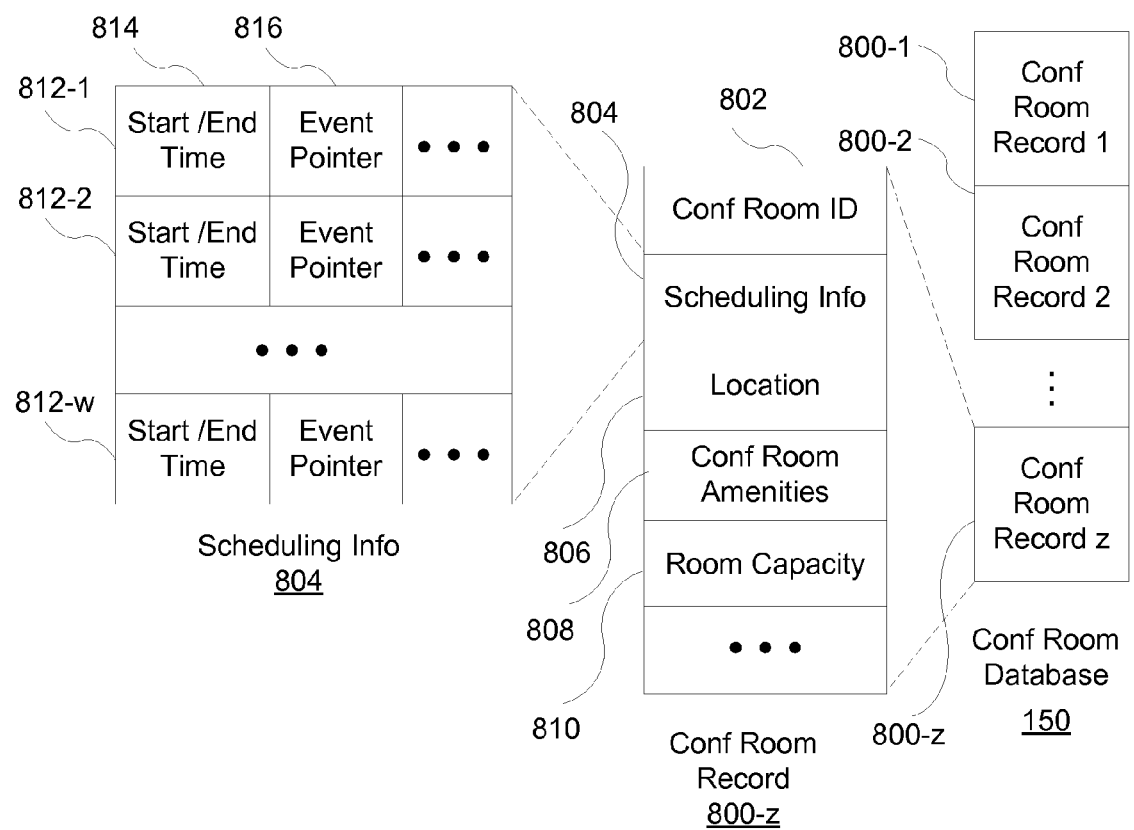
FIG. 8 is a block diagram illustrating an exemplary conference room database, an exemplary conference room record in the conference room database, and exemplary scheduling information in the conference room record, in accordance with some embodiments.

FIG. 8 is a block diagram illustrating an exemplary conference room database 150, an exemplary conference room record 800-*z*, and exemplary conference room scheduling information 804, in accordance with some embodiments. The conference room database 150 stores conference room record 800-*z*, where z represents the number of conference rooms. Therefore, a respective conference room record 800-*z* stores information associated with a corresponding conference room. The conference room record 800-*z* optionally stores conference room scheduling information 804.

In some embodiments, a conference room record (e.g., conference room record 800-*z*) includes the following data, or a subset or superset thereof:

Conference Room ID 802 that uniquely identifies a conference room (e.g., an n-bit binary number or a building and room number);

Scheduling information 804 (explained in more detail below); optionally, scheduling information 804 is not included in the conference room database 150, and instead is obtained by searching calendar database 120 for meetings located at one or more specified conference rooms;

Location 806 (e.g., city, campus, building, floor, section or sub-region of the building, and room number);

Conference Room Amenities 808 that identifies amenities of the respective conference room (see definition above); optionally, conference room amenities 808 are not included in the conference room database 150; and Room Capacity 810, which is either the number of people that fit comfortably into the conference room, or a room size indicator. The capacity may vary depending on the room set-up. As such the room capacity may have a value for the number of people standing, a value for the number of people sitting and the seating arrangement of the room (i.e., theater style, board meeting style, etc.).

In embodiments that include scheduling information within a conference room record 800, scheduling information 804 includes conference room scheduling records 812, for example conference room scheduling records 812-1 through 812-*w*, each of which represents a conference room reservation, where w represents the number of conference room scheduling records.

In some embodiments, conference room scheduling records (e.g., conference room scheduling records 812-1 through 812-*w*) include the following data, or a subset or superset thereof:

Meeting Start and End Time 814; and

Event Pointer 816 that points or links to a corresponding entry in Calendar Database 120.

Figure 9:
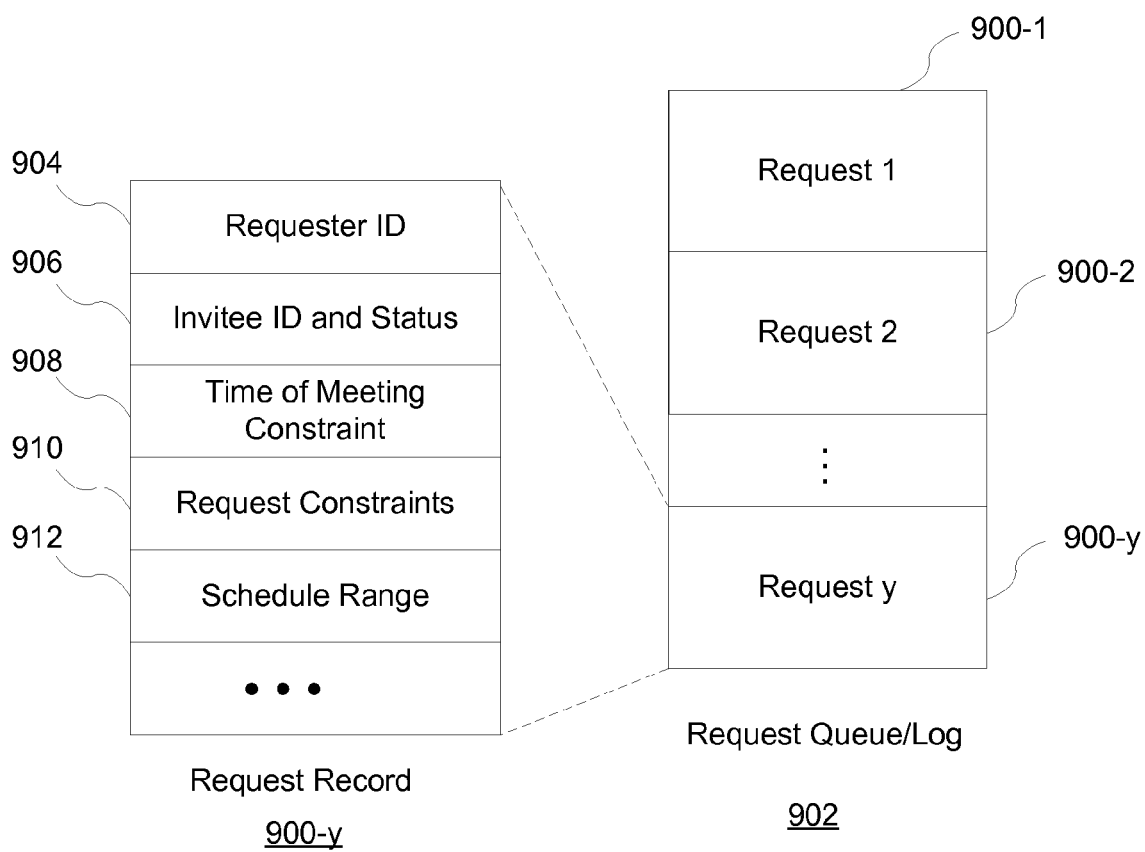
FIG. 9 is a block diagram illustrating an exemplary request queue or request log and an exemplary request queue/log record, in accordance with some embodiments.

In some other embodiments, conference room scheduling records (e.g., Conference Room Scheduling Records 810) also include pointers or links to corresponding conference room scheduling requests in request queue records 902 (FIG. 9).

FIG. 9 is a block diagram illustrating an exemplary request queue 902 or request log (depending on the status of the request) and an exemplary request record 900-*y*, in accordance with some embodiments. The request queue/log 902 stores request records, for example request record 900-1 through request queue record 900-*y*, where y may represent the number of scheduling requests. In some embodiments, the request queue/log 902 is a part of the calendar database 120. In other embodiments, the request queue/log 902 is maintained in a separate database (such as one of the "other databases 118" of FIG. 1). In yet other embodiments, the request queue/log 902 only has records for requests not yet processed, and is stored by calendar application 216 in temporary storage until the request has been processed.

In some embodiments, a request record (e.g., Request Record 900-*y*) for a respective conference room scheduling request includes the following data, or a subset or superset thereof:

Requester ID 904 that uniquely identifies a particular user who initiated the calendar request;

Invitee ID and optional status information 906 identify the invitee(s) associated with a calendar event that corresponds to the calendar request and this entry 900-*y*. The invitee IDs may comprise user IDs, email addresses or the like. In some embodiments, the status information, if provided, indicates which invitee(s) have accepted or declined the invitation;

Time of meeting constraints 908 (if any), such as start date, start time, end date, end time, and the duration of the meeting;

Request constraints 910 (if any) may include one or more of: whether changing the location of an already scheduled meeting is allowed, requested amenities for the conference room, requested room capacity, requested location, and requested proximity to the requester, an invitee, or another meeting; and An optional schedule range 912 which specifies one or more dates, or days or week, time periods in which the meeting should be scheduled.

In some other embodiments, request queue records include pointers to other databases (e.g., user information database 116) which store information associated with at least a subset of the plurality of constraints and include associated user preferences which may be used in addition to the specified constraints in obtaining a set of candidate calendar events.

In some embodiments, the invitee ID and status 906 includes a value corresponding to the requirement level of each invitee (e.g., required attendee, optional attendee, and guest/participant). In other embodiments, the invitee list and status 906 includes the rank or seniority of each invitee (see, for example, discussion of FIG. 5).

In some embodiments, the request record 900-y includes a pointer or link to a corresponding event entry in the calendar database 120. In some other embodiments, the request record 900-y includes at least a subset of information included in the corresponding entry in the calendar database 120.

Figure 10:
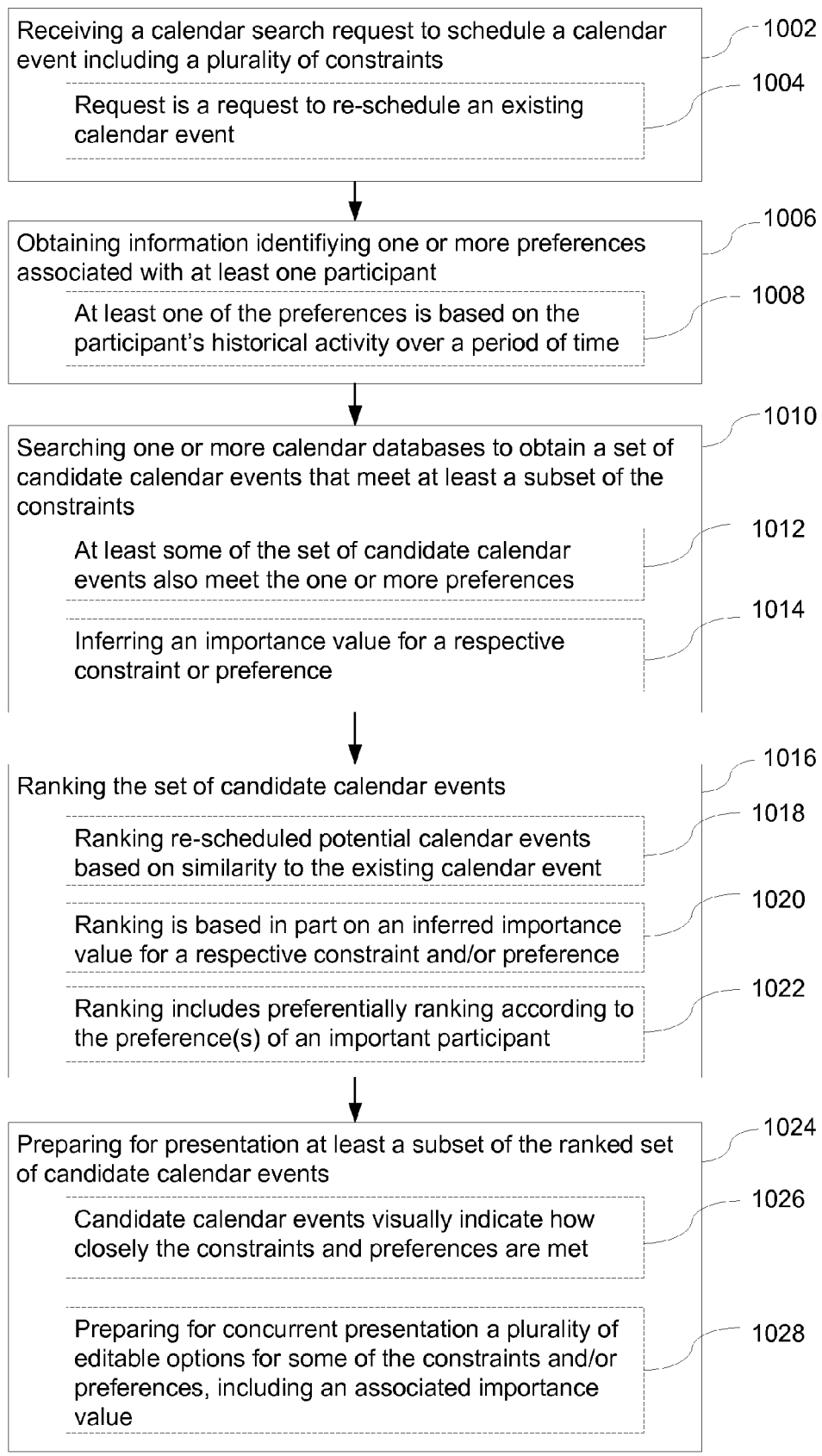
FIG. 10 is a flowchart representing a method of scheduling a calendar event, in accordance with some embodiments.

FIG. 10 is a flow chart representing a method of scheduling a calendar event, in accordance with some embodiments. The method is performed on a calendar system having one or more processors and memory storing one or more programs for execution by the one or more processors as discussed with respect to FIG. 2.

A calendar search request to schedule a calendar event is received (1002). The calendar search request includes a plurality of constraints. Typically, the constraints include at least one participant and a time of meeting constraint. Many other constraints may be included, as discussed above. The time of meeting constraint, if provided, includes one or more of the following: meeting start date, meeting start time, meeting end date, meeting end time, meeting duration, and/or a schedule range.

In some embodiments, the constraints include one or more of: requested conference room amenities, a schedule range, a requested location, requested room capacity, specified optional attendees, specified required attendees, and a specified preference for the at least one participant including one or more of: base location, base time zone, preferred proximity to base location, working hours, conference room location preferences, conference room amenity preferences, and preference for contiguous blocks of meetings.

Furthermore, in some embodiments, the requested conference room amenities include one or more of: tables, chairs, desks, podium, blackboard, whiteboard, electronic whiteboard, overhead projector, slide projector, video monitor, video camera, video conferencing equipment, television, video cassette recorder (VCR), digital video disc (DVD) player, compact disc (CD) player, tape player, tape recorder, computer, network lines, phone, fax, sound system, flip charts, telecommunication equipment, window, and access to a wireless network.

Optionally, a respective request to schedule a calendar event is a request to re-schedule an existing calendar event (1004). Other scheduling request are requests to schedule a new calendar event.

Information identifying one or more preferences associated with the at least one participant is obtained (1006). In some embodiments, at least one of the preferences is based on the at least one participant's historical calendar activity over a predetermined period of time (1008). For example, the preferences could be based on the participant's activity (e.g., meetings or calendar events) during the previous week, the previous N (e.g., three) weeks, the previous month, or even the previous year. In some embodiments, more recent activities are weighted higher in determining preferences. Sometimes, preferences include more than one set of preferences, each based on a different location. For example, if a user has a home office in a company's Palo Alto headquarters but takes frequent business trips to a Houston satellite office, then a set of preferences is stored for the Palo Alto location and another set of preferences is stored for the Houston location.

In some embodiments, the preferences associated with the at least one participant include one or more of: base location, base time zone, preferred proximity to base location, working hours, conference room location preferences, conference room amenity preferences, and preference for contiguous blocks of meetings.

One or more databases in a calendaring system are searched to obtain a set of candidate calendar events that meet at least a subset of the plurality of constraints (1010). In some embodiments, at least some of the set of candidate calendar events also meet at least a subset of the one or more obtained preferences (1012). Sometimes an importance value is inferred for a respective constraint or preference (1014). For example, if most of the historical calendar events for a meeting requestor include a particular constraint or preference, this constraint or preference may be inferred as important and therefore given a larger weight than other constraints of preferences.

The set of candidate calendar events is ranked (1016). In some embodiments, the ranking is based on the plurality of constraints and the one or more preferences. In some embodiments, when the request is a request to reschedule a calendar event, the set of candidate calendar events are ranked in part based on similarity between a respective candidate calendar event and the existing calendar event which has been requested to be rescheduled (1018). In embodiments where an importance value is inferred for a respective constraint or preference, the ranking is based in part on the inferred importance value (1020). In some embodiments, ranking includes preferentially ranking the set of candidate calendar events according to one or more preferences of an important participant (1022). An important participant may be the meeting requestor, a required attendee, an attendee specified as important, an attendee with high seniority (e.g., at or above a predefined threshold), an attendee with high rank (e.g., at or above a predefined threshold), or the like.

Finally, at least a subset of the ranked set of candidate calendar events are prepared for presentation (1024). In some embodiments, each candidate calendar event includes a specified start time. Each candidate calendar event may also include a duration, a location, and detailed information regarding which participants (if any) have hard conflicts or soft conflicts as discussed in more detail with reference to FIG. 12.

In some embodiments, preparing for presentation at least a subset of the ranked set of candidate calendar events further comprises visually indicating how closely the constraints and preferences are met by a respective candidate calendar event (1026). The visual indications are also discussed in more detail with respect to FIG. 12.

Additionally, in some embodiments, a plurality of editable options, including a subset of the received constraints and obtained preferences, are prepared for concurrent presentation with the ranked set of calendar events (1028). As such, the user may edit one or more constraints or options and then either (A) the client re-ranks the candidate calendar events in accordance with the modified constraints and/or modified options to make it easier to select one of the candidate calendar events, or (B) the server reruns a calendar search to get a new set of candidate calendar events in accordance with the modified constraints and/or options, as will be explained in more detail below with reference to FIG. 11.

It should be noted that in many instances a plurality of participants are included in the calendar event. In some embodiments, when a requested calendar event has a plurality of participants, the method includes obtaining information identifying one or more preferences for at least two participants of the plurality of participants, and ranking the set of candidate calendar events based on the plurality of constraints and the one or more preferences for the at least two participants of the plurality of participants. In some instances, the participants' preferences are given equal weight. In other instances, some participants' preferences are weighted more heavily than others. For example, the preferences of an important participant may be given more weight than the other participants' preferences.

Figure 11:
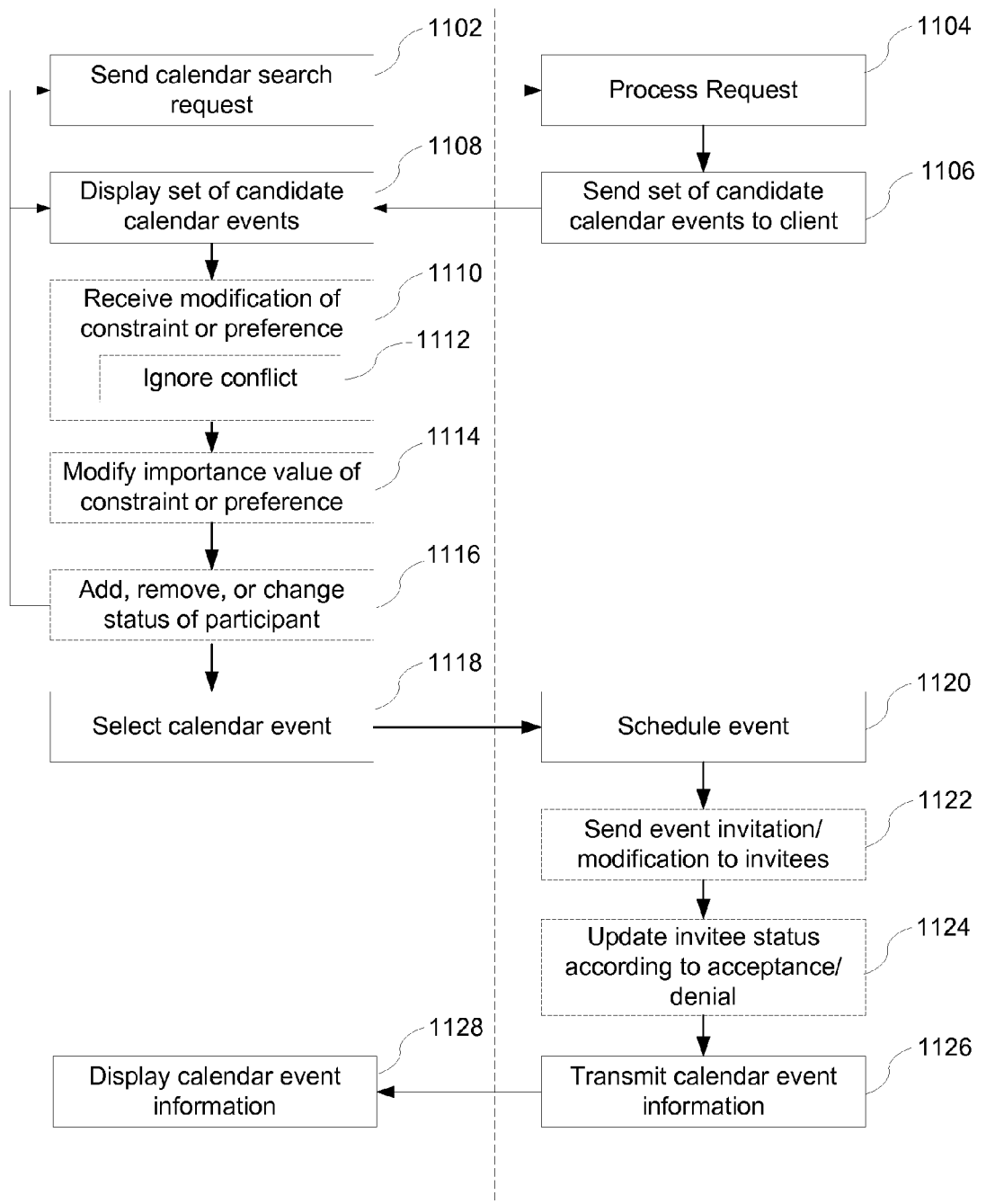
FIG. 11 is a flowchart representing a server client interaction when scheduling a calendar event, in accordance with some embodiments.

FIG. 11 is a flowchart representing a server client interaction when scheduling a calendar event, in accordance with some embodiments. The client 102 sends a calendar search request to the calendar system 108 (1102). The calendar system processes the request (1104), as discussed above with reference to FIG. 10. The calendar system then sends a set of candidate calendar events to the client (1106).

The client displays the set of candidate calendar events (1108). The set of candidate calendar events may look similar to those shown in FIG. 12. As explained above, a variety of editable options including a subset of the received constraints and obtained preferences may be presented along with the candidate calendar events.

Optionally, the client receives a modification of a constraint or preference from the user (1110). For example, the modification may be to ignore a conflict (1112). In some embodiments, the constraint modification options include one or more of: ignoring all conflicts for a particular invitee, ignoring a particular conflicting event for one invitee, or ignoring a particular event for all invitees. Optionally, when importance values of constraints or preferences are displayed and editable, the user may modify an importance value of a constraint or a preference (1114). In some embodiments, the constraint modification options include one or more of: adding a participant, removing a participant, and changing the status of a participant (i.e., from required to optional or vice versa) (1116).

In some embodiments, if any of the above changes or other modifications are made by the user, a modified calendar search request is sent from the client to the calendar system (1102). The calendar system then processes the modified calendar search request (1104) and sends a set of candidate events responsive to the modified calendar search request to the client (1106). In some embodiments, this will mean stepping through the processes outlined in FIG. 10. In other words, in some embodiments the process described above further includes receiving at least one changed option comprising a changed editable option of the plurality of editable options, and searching one or more databases in a calendaring system to obtain a second set of candidate calendar events that meet at least the changed option and at least a subset of the plurality of constraints. When the search is rerun at the server, both the set of calendar events and their rankings may be affected by the changes or modifications made by the user.

Optionally, instead of resubmitting the modified search calendar request to the calendar system (1102), in some embodiments the client (or the server) re-ranks the candidate calendar events in accordance with the modified constraints and/or modified options. For example, when an editable option includes an editable importance value for a respective constraint or preference, and a user changes or modifies at least one importance value, the candidate calendar events are re-ranked (by the client or the server) according to the changed importance value.

The process discussed above is repeated as the user continues to make changes or modifications. After the user is satisfied with his changes and modifications, he will select a calendar event from the set of candidate calendar events (1118). The selection is sent to the calendar system, and the calendar system schedules the event (1120). Optionally, the calendar system then sends invitations to the invitees (1122). It should be noted that in the cases where the calendar search request was a request to re-schedule an existing calendar event, the calendar system optionally sends cancellation or modification messages to the invitees of the previous calendar event (1124). Alternately, the calendars of the participants can be updated without sending explicit cancellation or modification messages.

As the calendar system receives responses from the invitees it updates the invitee status in the calendar database (e.g., user actions 422, FIG. 4; and/or invitee status 906 in the request log 902 of calendar database) or other database. The invitee status typically indicates acceptance, tentative acceptance or denial of the invitation/modification (1124). In some embodiments, if the invitee makes another response such as a comment or a request to modify the calendar event this will also be recorded.

Any time after the event has been scheduled (in step (1120)) the calendar event information can be transferred from the calendar system 108 to the client (1126). In some embodiments, the transmission is in response to a client request to view the calendar event status. In other embodiments, it is transmitted to the client periodically such as every minute, every five minutes, or every hour.

Once the client receives the calendar event information it can display the calendar event information (1128). The calendar event information is displayed on the client's display device 301 (FIG. 3). The calendar event information is usually displayed (1128) in response to a user request to view the calendar event, or a particular time frame, such as a daily, weekly, or monthly time frame.

Figure 12:
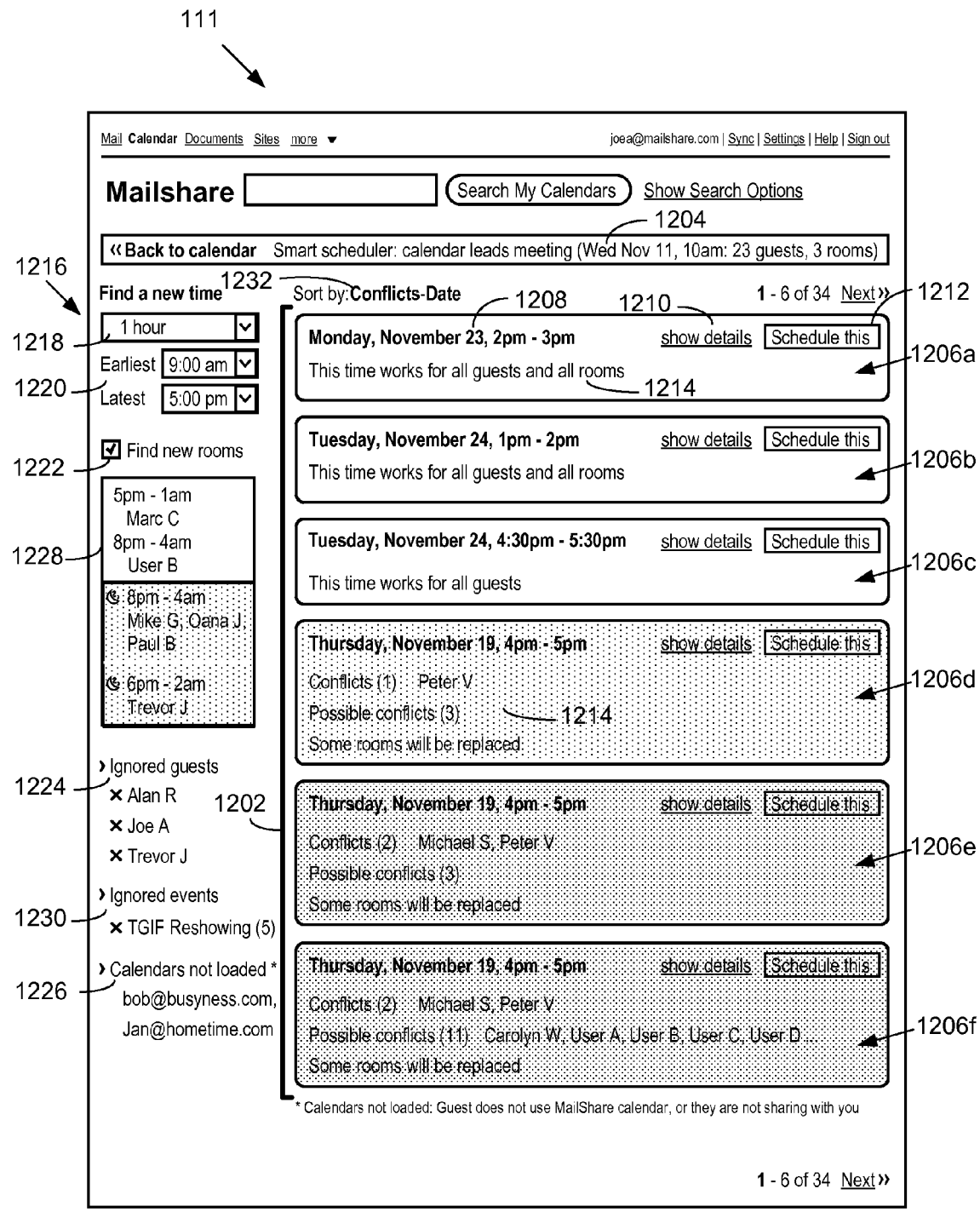
FIG. 12 is a schematic screen shot of an exemplary graphical user interface for displaying a set of candidate calendar events, in accordance with some embodiments.

FIG. 12 is a schematic screen shot of exemplary graphical user interface 111 for displaying a set of candidate calendar events 1202, in accordance with some embodiments. In the embodiment shown, the set of candidate calendar events 1202 are candidate calendar events for rescheduling an existing calendar event 1204. The existing calendar event 1204 had 23 guests and 3 rooms. As such, this would be a difficult calendar event to manually re-schedule.

The set of candidate calendar events 1202 is ranked based on meeting a plurality of constraints and one or more preferences. Furthermore, in this embodiment, the set of candidate calendar events 1202 (candidate calendar events 1206a-1206f) is ranked in part based on similarity between a respective candidate calendar event 1206 and the existing calendar event 1204. For example, the first event presented, in which all guests and rooms are available, is the event closest to the originally scheduled meeting time 1206a.

In this embodiment, each candidate calendar event 1206 is displayed with a date and time 1208. Each candidate calendar event 1206 includes more details which can be viewed by clicking on links such as the "show details" link 1210. Each candidate calendar event also provides a link 1212 to "schedule this." Each candidate calendar event also gives a short description of how well the constraints were met 1214. For example, calendar event 1206a states "This time works for all guests and all rooms." When conflicts arise, some information about the conflicts is also presented. For example, for candidate calendar event 1206d, "conflicts (1)" is included along with the name of the person who has a conflict "Peter V." Furthermore, a note that some other users have soft conflicts is noted as "possible conflicts (3)." Finally, a note regarding the status of the rooms is provided which states "some rooms will be replaced."

The candidate calendar events 1206 are each colored or shaded to visually indicate how closely the constraints and preferences are met by a respective candidate calendar event 1206. In some embodiments, the font(s) used to represent candidate calendar events is(are) color coded, for example: green for the events where the time works for all guests and/or all rooms, orange for soft (possible) conflicts, and red for conflicts. In other embodiments the background color of displayed candidate calendar events corresponds to the number of constraints and preferences not met by the candidate calendar events. In one example, the background color becomes progressively darker as more constraints and preferences are not met, as shown in FIG. 12. In some embodiments, font size and/or style is used to indicate how closely the constraints and preferences are met by a respective candidate calendar event 1206. In some embodiments, text bolding is used for events where the time works for all guests and/or rooms and a text with strikethroughs is used for events with conflicts.

FIG. 12 also presents, concurrently with the set of candidate calendar events 1202, a plurality of editable options 1216. The editable options 1216 include some of the received constraints and obtained preferences. Some of the editable options are duration of the meeting 1218, working hours 1220, and an option to keep original rooms or change them 1222. In some embodiments, one or more options (e.g., option 1222) are omitted from the user interface when those options are not applicable to the requested calendar event (e.g., if no room resources are used or required by the requested calendar event). Optionally, a user-editable date boundary option (not shown) is also provided. Optionally, additional checkboxes (not shown) may be provided, for example a checkbox to only show candidate calendar events where all participants are available, a checkbox to omit candidate calendar events having certain conflicts, and so on.

Furthermore, additional information about particular attendees may be provided such as ignored invitees 1224 and invitees whose calendars are not loaded 1226. In this embodiment, some of the invitees work in a different time zone than the meeting requestor, so the GUI also displays the time for those invitees 1228. This could be useful in determining when an invitee is likely to attend even though he or she may not have a conflicting calendar event. Also, additional information about particular rooms or events may be provided, such as the ignored events 1230. In some embodiments, the user interface 111 for displaying candidate calendar events includes an event sort selector 1232; in the example in FIG. 12 the user-selected sort selector is "conflicts-date," which indicates that candidate calendar events are sorted first by number of conflicts, and then by date.

Figure 13:
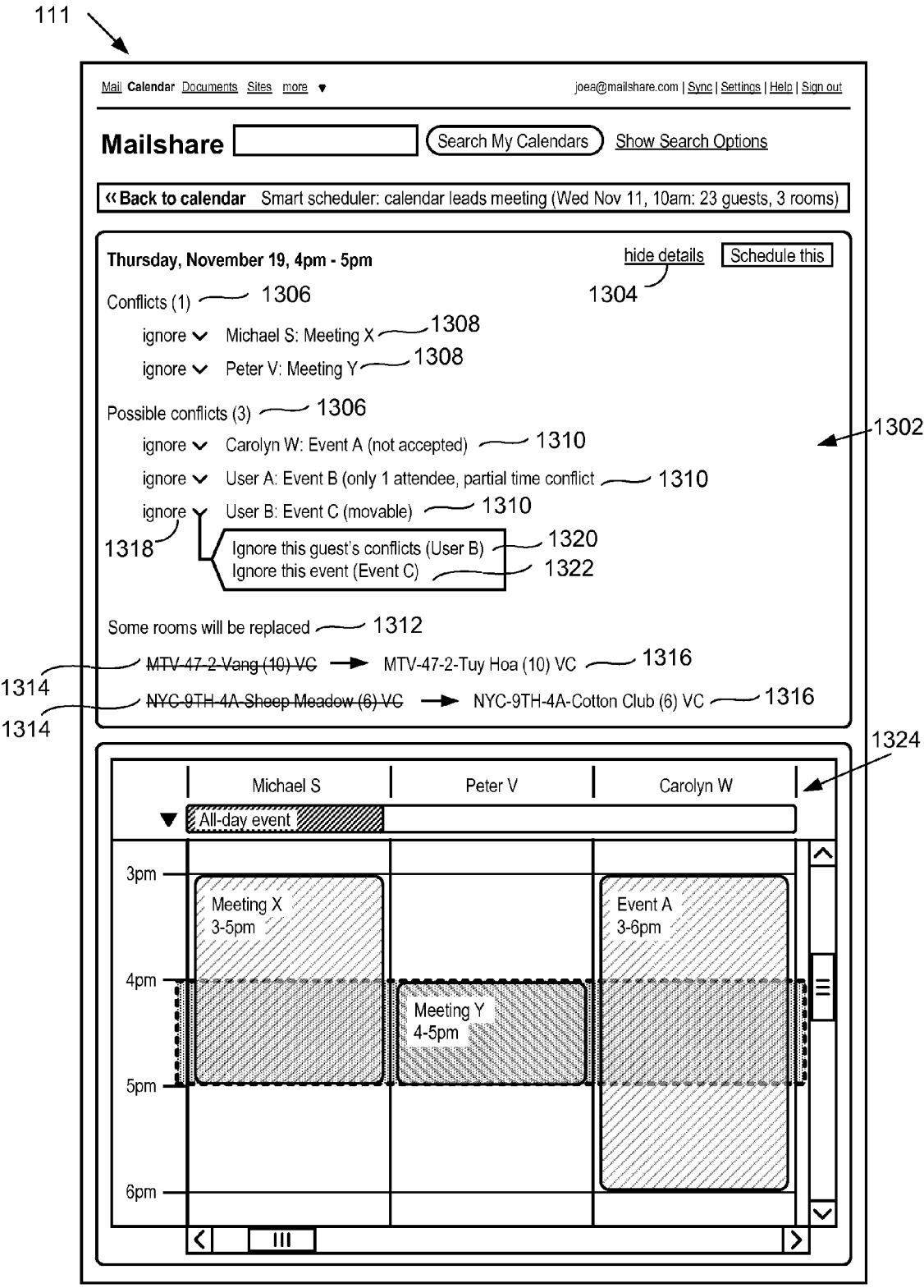
FIG. 13 is a schematic screen shot of exemplary graphical user interface for displaying details associated with a respective calendar event, in accordance with some embodiments.

FIG. 13 is a schematic screen shot of exemplary graphical user interface 111 for displaying details in association with a respective calendar event 1206e of a set of candidate calendar events 1202 (FIG. 12). In this embodiment, the "show details" link 1210 was selected by the user for the November 19, 4 pm-5 pm candidate calendar event 1206e. In response, a detailed GUI 1302 is displayed. The detailed GUI includes a link to hide the details 1304. It includes detailed information about the conflicts of the invitees with conflicts ("Michael S." and "Peter V.") such as the title of the event in conflict 1308, ("Meeting X" and "Meeting Y" respectively). The detailed GUI also indicates whether a conflict is hard or soft (i.e., a "conflict" or a "possible conflict") 1306. The possible conflicts also include detailed information about why the event is only a "possible conflict" 1310. For example, Carolyn W. has a conflicting event which she has "not accepted" (and has also not yet declined), User A has "only 1 attendee, partial time conflict," and User B has an event that is "moveable." FIG. 13 also includes user selectable links or options 1318, 1320, 1322 to ignore a conflict, including an "ignore" link 1318 for ignoring a respective conflict. In some embodiments, all conflicts for a particular invitee can be ignored by selecting an option 1320. Alternatively, just the currently conflicting event can be ignored by selecting another option 1322.

The detailed GUI 1302 also includes information about the rooms 1312. In this embodiment, the previously scheduled rooms 1314 are displayed on the left of a right pointing arrow while the candidate rooms 1316 are displayed on the right. In some embodiments, the previously scheduled rooms 1314 are further visually distinguished from the candidate rooms by being crossed out 1314.

The detailed GUI 1302 also includes a card view 1324 of all of the invitees. The invitees with hard conflicts (if any) are listed on the left hand side, then the invitees with soft conflicts (if any) follow, and finally the invitees without conflicts (if any) are listed on the right hand side of the card view. The card view 1324 provides a visualization of the calendars of all of the invitees as compared to the rest of each invitee's schedule. This can be especially helpful in noting if the conflicting event only partially overlaps the proposed time. It can also be helpful in noting how busy an invitee is. For example, if an invitee with a conflict is very busy, the meeting requestor may choose to ignore that person's conflicts. Alternatively, if an invitee with a conflict is very busy and important the meeting requestor may increase an importance value of that person for purposes of re-ranking the candidate calendar events.

Figure 14:
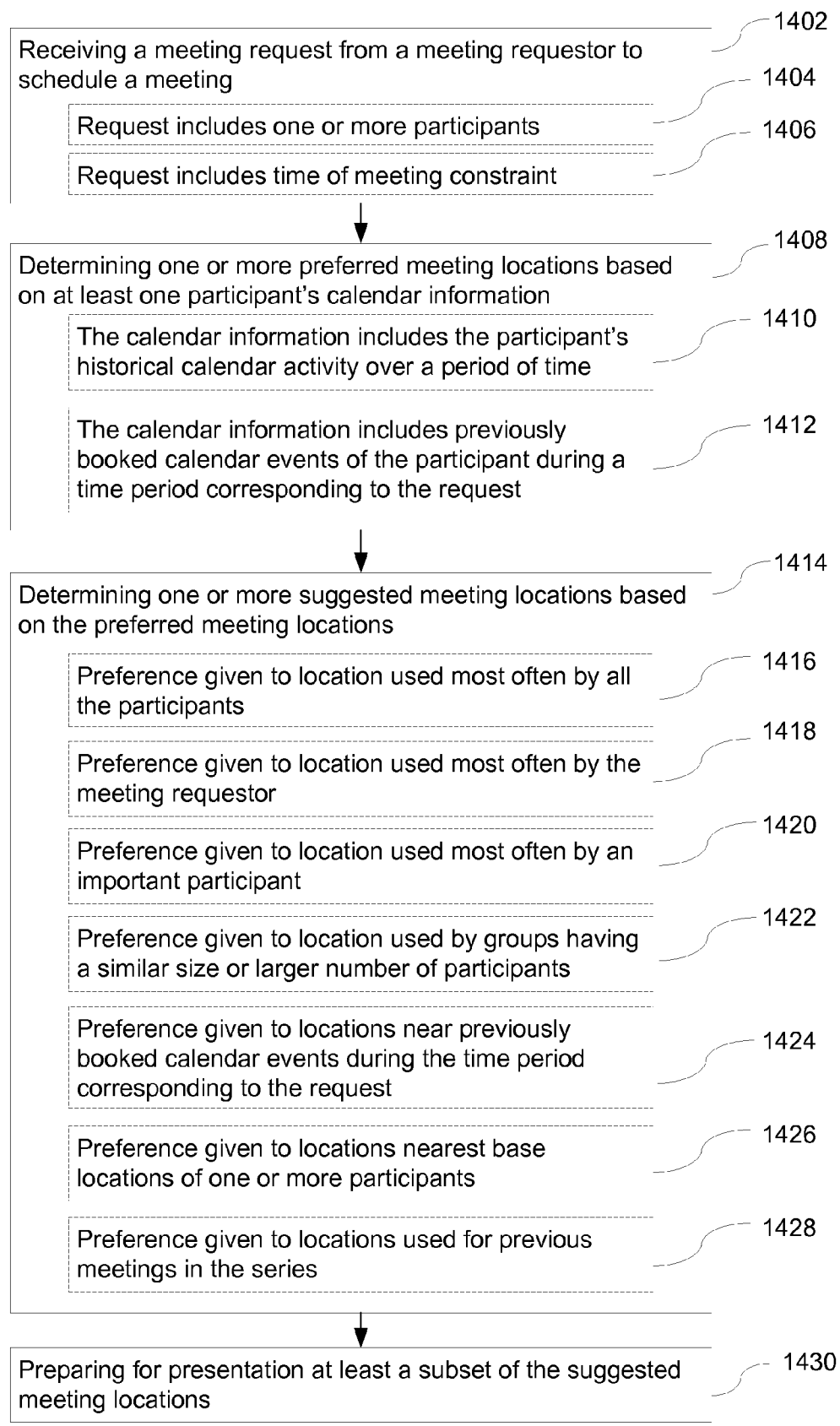
FIG. 14 is a flowchart representing a method of determining suggested meeting locations, in accordance with some embodiments.

FIG. 14 is a flow chart representing a method of determining suggested meeting locations, in accordance with some embodiments. The method is performed on a calendar system having one or more processors and memory storing one or more programs for execution by those processors as discussed with respect to FIGS. 1 and 2.

A request to schedule a meeting is received from a meeting requestor (1402). The request may include one or more participants (1404). In some embodiments, the meeting requestor is a participant, while in other embodiments the meeting requestor is not a participant. When the meeting requestor is a participant, the meeting requestor's previously booked events may be given more weight, as discussed below. The meeting request may include a time of meeting constraint (1406). In this embodiment, a time of meeting constraint includes one or more of: a start time, an end time, a start date, an end date, a duration, and a schedule range.

One or more preferred meeting locations are determined based on previously booked calendar information associated with at least one participant (1408). In some embodiments, the preferred meeting locations are based on previously booked calendar information associated with two or more of the participants, or all of the participants. In some embodiments, the previously booked calendar information includes a participant's historical calendar activity over a predetermined period of time (1410). Some embodiments use the last N weeks (e.g., two or three weeks) of calendar activity. Other embodiments use the last month or year of calendar activity. Still other embodiments use the last X number of calendar events irrespective of the passage of time. For example, the last 50 calendar events may be used. In some embodiments, the previously booked calendar information includes previously booked calendar events of the respective participant during a time period corresponding to the request (1412). For example, for a meeting request having a specified time of 1 pm to 2 pm on a particular weekday, the historical calendar information searched for previously booked calendar events may be restricted to weekday meetings, in the afternoon, during the last N weeks. In some embodiments, this time period corresponding to the request varies depending on the specificity of the time of meeting constraint. If both a date and time are provided, then the time period for which historical calendar events are searched may be small. In some embodiments, the time period will include a predefined number of hours (e.g., three hours) before and a predefined number of hours (e.g., three hours) after the time period specified in the meeting request. Alternatively, if a schedule range is provided, all previously booked calendar events within the schedule range are used in some embodiments.

One or more suggested meeting locations are determined based on the preferred meeting locations (1414). In some embodiments, preference is given to a location most often used by all of the participants (1416). In other embodiments, preference is given to the location used most often by the meeting requestor (1418). It should be noted that if the meeting requestor is not an attendee, the meeting requestor's preference will not be used. In yet other embodiments, preference is given to the location used most often by the most important participant (1420). An important participant may be a required attendee, an attendee specified as important, an attendee with a high seniority, or an attendee with a high rank within a company or organization.

In some embodiments, when determining suggested meeting locations, preference is given to meeting locations used by groups having a similar number of participants or a larger number of participants as the requested meeting (1422). A group size is determined according to how many participants are specified in the request. Then the suggested meeting locations are determined based on preferred meeting locations used to host a same size or larger group. In some embodiments, meeting locations used by groups having the same number of participants are preferred. For example, when processing a meeting request having six participants, the calendar system will prefer locations used by other meetings with six attendees. In other embodiments, locations used by groups having merely a similar number of participants are preferred. In some embodiments, the scale for similarly sized groups changes with the size of the group in the meeting request. For example, for meeting requests for groups of one to seven people, the calendar system may prefer locations attended by groups having the same size+/−1 person. For meeting requests for groups of eight to twelve people, the calendar system may prefer locations attended by groups having the same size+/−2 people. For larger groups, even more variation is allowed. For example, for meeting requests for groups of 50 or more people, a large range of similarity may be used as, depending on the company or organization, locations large enough to accommodate so many people may be limited.

In embodiments where preferred meeting locations are determined at least partially based on previously booked calendar events of one or more participants during a time period corresponding to the request, determining the suggested meeting locations includes giving preference to locations near the previously booked calendar events during the relevant period of time (1424). For example, in some embodiments, determining one or more suggested meeting locations includes giving preference to locations near previously booked calendar events of a particular participant during the time period corresponding to the request. In some embodiments, the particular participant is the meeting requestor, a required attendee, an attendee specified as important, an attendee with a high seniority, or an attendee with a high rank. In other embodiments, determining one or more suggested meeting locations includes giving preference to locations near previously booked calendar events of a plurality of the one or more participants during the time period corresponding to the request. For example, all of the participants' calendar events may be included, or calendar events of all of the participants who are sharing their calendars on the system and have booked calendar events within the time period may be included. In still other embodiments, participants are weighted differently depending on how close the meeting in question is to the previously booked calendar event. For example, a participant would have difficulty attending a meeting across campus if a previously booked calendar event ended at the same time that the requested meeting was scheduled to start. Thus, in some embodiments, the locations of meetings scheduled directly before or after the meeting in question will be given the highest weight.

In some embodiments, preference is given to locations nearest base locations of one or more of the participants (1426). In some embodiments, preference is given to meeting locations nearest base locations of all of the participants, or at least a plurality of the participants. Other embodiments give preference to the base locations of particular participants, such as important participants as defined above. In some embodiments, base locations are specified by the participants or published by a system directory. For example, a base location could be taken directly from an assigned office or cubicle. In other embodiments, the base location will be determined by the calendar system. For example, in some embodiments, a participant's base location is determined by the calendar system based on the participant's historical calendar activity over a predetermined period of time and/or previously booked calendar events of the participant during a time period corresponding to the request. As such, the base location may change depending on the previously booked calendar events used. This could be useful when a participant has a different base location than the published base location because he is on a business trip or has moved offices without updating his profile or company directory.

Some meeting requests are part of a series. For example, a weekly team meeting may usually take place on Wednesday afternoons. When the requested meeting is one of a series of meetings, determining one or more suggested meeting locations includes giving preference to meeting locations used for previous meetings in the series (1428). While sometimes a series of meetings is set up in advance, sometimes they are not. In some embodiments, an event is one of a series when the event shares a same title and at least one of the following characteristics with a previously booked calendar event: same participants, same time of day, same day of the week, same day of the month, same relative day of the month (such as the second Thursday). For example, a nurse who always works at night may always have the same entry title "work," with a known start and end time, but has to schedule each workday in her calendar because her particular work days change from week to week. Therefore, recognition of the matching title, start, and end time would indicate that the location (e.g., the hospital) would be the preferred suggested location.

Once one or more suggested meeting locations are determined, at least a subset of the one or more suggested meeting locations is prepared for presentation (1430) at a client corresponding to the meeting requestor. FIG. 13 shows one embodiment of suggested meeting locations being presented for a meeting that has been rescheduled. Other presentations of suggested meeting locations would look like a list, similar to the set of candidate calendar events illustrated in FIG. 12.

Figure 15:
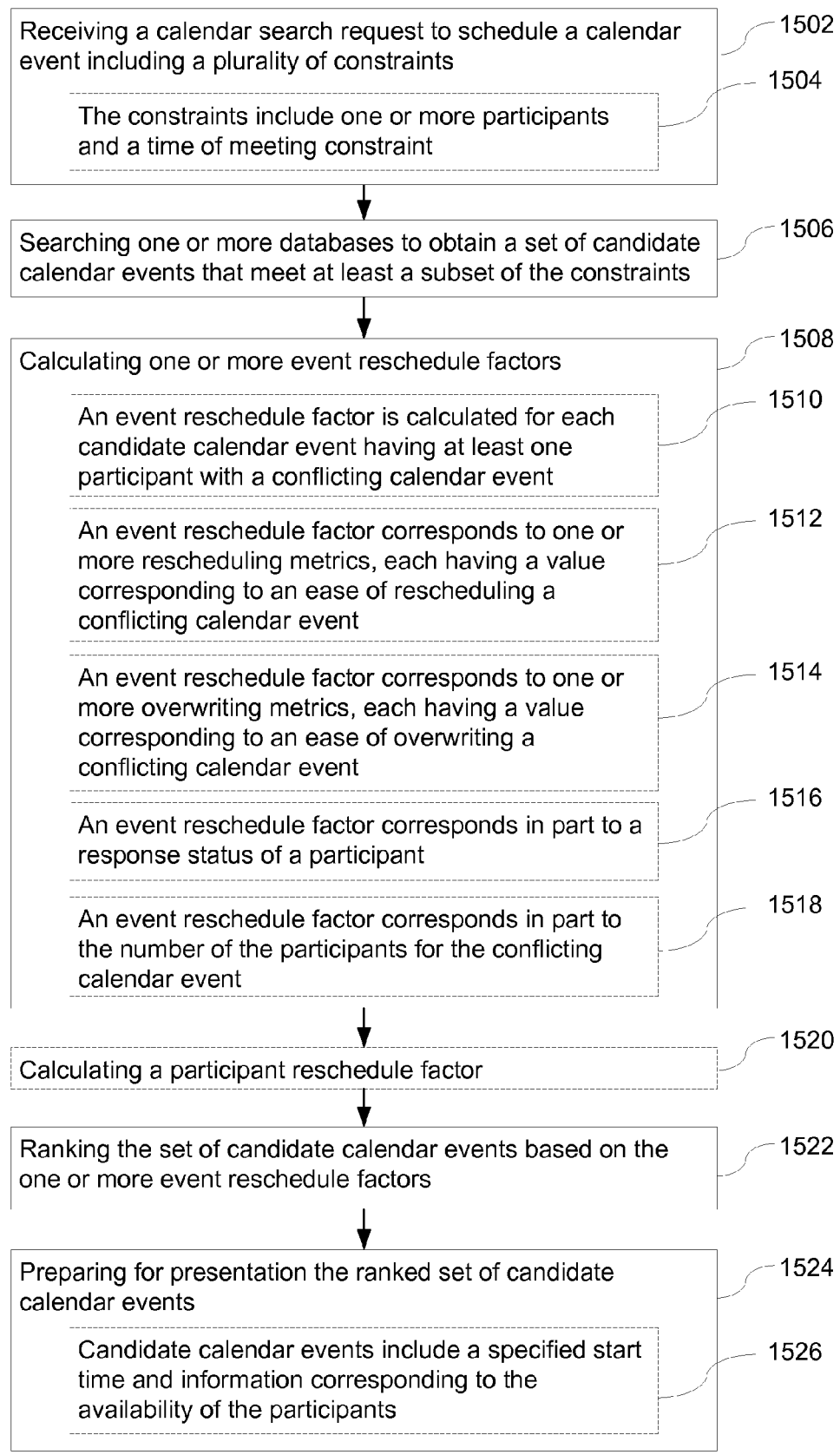
FIG. 15 is a flowchart representing another method of scheduling a calendar event, in accordance with some embodiments.

FIG. 15 is a flowchart representing another method of scheduling a calendar event, in accordance with some embodiments. The method is performed on a calendar system having one or more processors and memory storing one or more programs for execution by the one or more processors, as discussed with respect to FIG. 2.

A calendar search request to schedule a calendar event is received from a user (1502). The user may be a participant in the meeting or may be an administrator or other non-attending person. In some embodiments, the request is to schedule a new calendar event, while in other embodiments it is to re-schedule an existing calendar event. The calendar search request includes a plurality of constraints. In some embodiments, the constraints included one or more participants and a time of meeting constraint (1504). In some embodiments, the time of meeting constraint may include a specified schedule range, such as specifying that the calendar event should take place within the next week even if no time can be found in which all of the other constraints are met. Other time of meeting constraints are described above.

One or more databases in the calendaring system is searched to obtain a set of candidate calendar events that meet at least a subset of the plurality of constraints (1506). In some instances, especially those in which many participants are included, there may be no candidate calendar events that meet all of the constraints. For example, at least one participant may have a conflicting calendar event for each candidate calendar event in the set. Or the only candidate calendar event in which all of the constraints are met is in the too distant future to be helpful. For example, if the soonest time at which all participants are available and for which there is an available conference room is two months from now, it is likely that the best candidate calendar event will not satisfy all the constraints. As such, the calendaring system ranks the candidate calendar events according to not only how many constraints are or are not met, but also the importance of each constraint and conflict. To this end, in some embodiments, the calendaring system employs event reschedule factors when ranking the candidate calendar events as described below.

One or more event reschedule factors are calculated (1508). In some embodiments, an event reschedule factor is calculated for each candidate calendar event for which at least one participant has a conflicting calendar event (1510). The event reschedule factor is based on one or more metrics corresponding to the conflicting calendar event. As described in more detail below, in various embodiments and circumstances, event reschedule factors correspond to one or more of: the ease of rescheduling a conflicting calendar event, an ease of overwriting a conflicting calendar event, the response status of the participants, and the number of participants in the conflicting calendar event.

In some embodiments, an event reschedule factor corresponds to one or more rescheduling metrics, each rescheduling metric having a value corresponding to an ease of rescheduling a corresponding conflicting calendar event (1512). There are a variety of reasons why some events might be considered easier to reschedule than others. Sometimes the event owner gives the event an explicit status label such as "movable," "unmovable," or "important." In some embodiments, the ease of rescheduling corresponds in part to the ownership of the conflicting calendar event. For example, sometimes an event is considered easier to reschedule when the user has ownership of the conflicting calendar event. The event may be considered easier to move if the owner is someone who reports to, or is hierarchically below the owner of the requested calendar event. In some embodiments, the ease of rescheduling corresponds in part to the closeness of association between the user and participants of the conflicting calendar event. For example, the event is considered easier to move if the owner of the conflicting calendar event has a close association with the owner of the requested calendar event. In some embodiments, a close association is determined based on interconnections between members of a social graph, as shown in FIG. 6. In some embodiments, a close association may be determined by the amount of communications, such as email and/or IM communications, between the members as shown in FIG. 7.

In some embodiments, rather than determining if a conflicting event can be "moved" it is considered a candidate to be overwritten (i.e., "double-booked.") In some embodiments, an event reschedule factor corresponds to one or more overwriting metrics, each overwriting metric having a value corresponding to an ease of overwriting a corresponding conflicting calendar event (1514). For example, sometimes users put "all day" events on their calendars that are really just reminders, like "pay rent." In such an instance the user does not actually have a conflict, and would be more than willing to overwrite the conflicting event. One indication that an event is indeed likely to be over-writable is if it has already been overwritten. Thus, in some embodiments, the ease of overwriting corresponds in part to whether the corresponding conflicting calendar event has been overwritten. In other embodiments, the event may be a recurring series whose previous members of the series have been overwritten. A good example of this is a daily recurring event for "lunch," which the participant may not mind overwriting now and again. As such, in some embodiments, the ease of overwriting corresponds in part to whether the corresponding conflicting calendar event is a member of a repeating event series, wherein a previous member of the series has been overwritten. The overwriting could be by a third event, or could be by the previous version of an event that is being re-scheduled. In other embodiments, the ease of overwriting corresponds in part to what portion of the conflicting calendar event and a candidate calendar event overlap each other. For example, if the conflicting calendar event and the candidate calendar event only overlap by five minutes, the participant may be able to attend the important parts of both events and will not mind over-writing a portion of the conflicting calendar event. If on the other hand, the events overlap each other completely, the overwriting is less likely to be a good option.

In some embodiments, a respective event reschedule factor corresponds in part to response statuses of the one or more participants (1516). If an attendee has responded "maybe" to the conflicting calendar event, then that event will be considered easier to re-schedule or overwrite. If an attendee has not yet responded, the same thing may be true. In some embodiments, a no-response status also takes into account how old the conflicting event invitation is. For example, if the invitation is a week old, the likelihood of the participant going is lower than if the invitation is only a few minutes old and the participant may simply not have seen the invitation yet. In some embodiments, the ease of rescheduling corresponds in part to a response status of each attendee of the conflicting calendar event. In some embodiments, the ease of overwriting corresponds in part to a response status of a plurality of attendees of the conflicting calendar event. For example, if a majority of the participants have responded "no" to an event, it is considered easier to overwrite than an event to which a majority of the participants have responded "yes." In some embodiments, the historical behavior and response status for an attendee is taken into account. For example, if a participant routinely accepts a certain meeting in a series and then later often cancels, and if the current conflict is a part of this series, it may be considered easier to reschedule than another event which is a part of a series that the participant routinely accepts and attends.

In some embodiments, a respective event reschedule factor corresponds in part to the number of participants for the conflicting calendar event (1518). In some embodiments, an event with only one attendee is considered a "soft conflict" or a potential conflict, because such an event has the potential to be easily overwritten or re-scheduled for another time. As such, in some embodiments, the ease of rescheduling corresponds in part to the number of attendees of the conflicting calendar event. Similarly, in some embodiments, the ease of overwriting corresponds in part to the number of attendees of the conflicting calendar event. Generally, events with many attendees are harder to reschedule or overwrite than events with only a few attendees. However, in some embodiments, after a cut off number this rule regarding large numbers of attendees may be disregarded, at least for the overwriting metrics. For example, everyone in a company may be invited to a company "Summer Barbeque" between noon and 3 PM, but that does not necessarily mean that no other meetings should take place during this entire time frame. Furthermore, if all of the attendees of the conflicting calendar event are also specified participants in the event corresponding to the search request, then the conflicting calendar event may be considered easier to move or overwrite. The user is presented with this information so that she can manually determine which meeting is more important or easier to re-schedule. In some instances, the meetings may even be combined.

In some embodiments, optional participant reschedule factors are also calculated (1520). A participant reschedule factor is calculated for a respective participant based on the respective participant's availability despite one or more conflicting calendar events. The conflicting calendar events are scheduled calendar events that conflict with at least one of the candidate calendar events. In some embodiments, the participant reschedule factor corresponds in part to an amount of unscheduled time a respective participant has in the schedule range. For example, if the participant has a relatively busy schedule, rescheduling will be more difficult than if the participant has a relatively open schedule. In some embodiments, the participant reschedule factor corresponds in part to an importance metric for a respective participant. In some embodiments, the importance metric is based on the respective participant's seniority, rank, and/or specified importance (such as the participant being marked as an optional participant, a regular participant, or an important participant). In some embodiments, calculating a participant reschedule factor includes taking into account whether the participant historically attends calendar events similar to the requested calendar event.

As alluded to above, the set of candidate calendar events is ranked based on the one or more event reschedule factors (1522). In embodiments that calculate participant reschedule factors, the set of candidate calendar events is ranked based on the participant reschedule factors as well. The ranked set of candidate calendar events is prepared for presentation (1524). The ranked set of candidate calendar events is displayed on a client device and may be modified and selected in the same manner discussed with respect to FIG. 11. In some embodiments, each candidate calendar event includes a specified start time and information corresponding to available participants. FIG. 12 illustrates one possible set of displayed candidate calendar events which each include a start and end time and information about the room(s) and participants. For example, element 1206e (FIG. 12) includes information stating that Michael S. and Peter V. have "conflicts" and three other participants have "possible conflicts."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of scheduling calendar events, performed on a system having one or more processors and memory storing one or more programs for execution by the one or more processors so as to perform the method, the method comprising:
    receiving a calendar search request from a user to schedule a calendar event including a plurality of constraints including one or more participants and a time of meeting constraint;
    searching one or more databases in a calendaring system to obtain a set of candidate calendar events that meet at least a subset of the plurality of constraints, wherein the set of candidate calendar events comprises a plurality of candidate calendar events;
    calculating one or more event reschedule factors, including an event reschedule factor for each candidate calendar event for which at least one participant has a conflicting calendar event, based on one or more metrics corresponding to the conflicting calendar event;
    ranking the set of candidate calendar events based on the one or more event reschedule factors; and
    preparing for concurrent presentation a plurality of candidate calendar events in the ranked set of candidate calendar events, the presentation for each respective candidate calendar event including a respective specified start time and information corresponding to available participants.

2. The method of claim 1, wherein the request to schedule a calendar event is a request to re-schedule an existing calendar event.

3. The method of claim 1, wherein a respective event reschedule factor corresponds to one or more rescheduling metrics, each rescheduling metric having a value corresponding to an ease of rescheduling a corresponding conflicting calendar event.

4. The method of claim 3, wherein the ease of rescheduling corresponds in part to the ownership of the conflicting calendar event.

5. The method of claim 4, wherein an event is considered easier to reschedule when the user has ownership of the conflicting calendar event.

6. The method of claim 3, wherein the ease of rescheduling corresponds in part to the closeness of association between the user and participants of the conflicting calendar event.

7. The method of claim 1, wherein a respective event reschedule factor corresponds in part to one or more overwriting metrics, each overwriting metric having a value corresponding to an ease of overwriting a corresponding conflicting calendar event.

8. The method of claim 7, wherein the ease of overwriting corresponds in part to what portion of the conflicting calendar event and a candidate calendar event overlap each other.

9. The method of claim 7, wherein the ease of overwriting positively corresponds to whether the corresponding conflicting calendar event has been overwritten.

10. The method of claim 9, wherein the ease of overwriting corresponds in part to whether the corresponding conflicting calendar event is a member of a repeating event series for which a previous member of the series has been overwritten.

11. The method of claim 1, wherein a respective event reschedule factor corresponds in part to response statuses of the one or more participants.

12. The method of claim 1, wherein a respective event reschedule factor corresponds in part to the number of participants for the conflicting calendar event.

13. The method of claim 1, further including:
for each of a plurality of respective participants, calculating a participant reschedule factor for a respective participant based on the respective participant's availability despite one or more conflicting calendar events comprising scheduled calendar events that conflict with at least one of the candidate calendar events; and
ranking the set of candidate calendar events based on the participant reschedule factors.

14. The method of claim 13, wherein the participant reschedule factor corresponds in part to an amount of unscheduled time a respective participant has in the schedule range.

15. The method of claim 13, wherein the participant reschedule factor corresponds in part to an importance metric for a respective participant, wherein the importance metric based on one or more of: the respective participant's seniority, rank, and specified importance.

16. The method of claim 13, wherein calculating a participant reschedule factor includes taking into account whether the participant historically attends calendar events similar to the requested calendar event.

17. A calendar system, for scheduling calendar events, comprising:
one or more central processing units for executing programs;
memory storing one or more programs be executed by the one or more central processing units;
the one or more programs comprising instructions for:
receiving a calendar search request from a user to schedule a calendar event including a plurality of constraints including one or more participants and a time of meeting constraint;
searching one or more databases in a calendaring system to obtain a set of candidate calendar events that meet at least a subset of the plurality of constraints, wherein the set of candidate calendar events comprises a plurality of candidate calendar events;
calculating one or more event reschedule factors, including an event reschedule factor for each candidate calendar event for which at least one participant has a conflicting calendar event, based on one or more metrics corresponding to the conflicting calendar event;
ranking the set of candidate calendar events based on the one or more event reschedule factors; and
preparing for concurrent presentation a plurality of candidate calendar events in the ranked set of candidate calendar events, the presentation for each respective candidate calendar event including a respective specified start time and information corresponding to available participants.

18. The system of claim 17, wherein a respective event reschedule factor corresponds to one or more rescheduling metrics, each rescheduling metric having a value corresponding to an ease of rescheduling a corresponding conflicting calendar event.

19. The system of claim 17, wherein a respective event reschedule factor corresponds in part to one or more overwriting metrics, each overwriting metric having a value corresponding to an ease of overwriting a corresponding conflicting calendar event.

20. The system of claim 17, wherein a respective event reschedule factor corresponds in part to response statuses of the one or more participants.

21. The system of claim 17, wherein a respective event reschedule factor corresponds in part to the number of participants for the conflicting calendar event.

22. The system of claim 17, further including instructions for:
calculating a participant reschedule factor for a respective participant based on the respective participant's availability despite one or more conflicting calendar events comprising scheduled calendar events that conflict with at least one of the candidate calendar events; and
ranking the set of candidate calendar events based on the participant reschedule factor.

23. The system of claim 17, further including instructions for:
for each of a plurality of respective participants, calculating a participant reschedule factor for the respective participant based on the respective participant's availability despite one or more conflicting calendar events comprising scheduled calendar events that conflict with at least one of the candidate calendar events; and
ranking the set of candidate calendar events based on the participant reschedule factors.

24. A computer readable storage medium storing one or more programs configured for execution by a computer, the one or more programs comprising instructions for:
receiving a calendar search request from a user to schedule a calendar event including a plurality of constraints including one or more participants and a time of meeting constraint;
searching one or more databases in a calendaring system to obtain a set of candidate calendar events that meet at least a subset of the plurality of constraints, wherein the set of candidate calendar events comprises a plurality of candidate calendar events;
calculating one or more event reschedule factors, including an event reschedule factor for each candidate calendar event for which at least one participant has a conflicting calendar event, based on one or more metrics corresponding to the conflicting calendar event;
ranking the set of candidate calendar events based on the one or more event reschedule factors; and
preparing for concurrent presentation a plurality of candidate calendar events in the ranked set of candidate calendar events, the presentation for each respective candidate calendar event including a respective specified start time and information corresponding to available participants.

25. The computer readable storage medium of claim 24, wherein a respective event reschedule factor corresponds to one or more rescheduling metrics, each rescheduling metric having a value corresponding to an ease of rescheduling a corresponding conflicting calendar event.

26. The computer readable storage medium of claim 24, wherein a respective event reschedule factor corresponds in part to one or more overwriting metrics, each overwriting metric having a value corresponding to an ease of overwriting a corresponding conflicting calendar event.

27. The computer readable storage medium of claim 24, wherein a respective event reschedule factor corresponds in part to response statuses of the one or more participants.

28. The computer readable storage medium of claim 24, wherein a respective event reschedule factor corresponds in part to the number of participants for the conflicting calendar event.

29. The computer readable storage medium of claim 24, further including instructions for:
calculating a participant reschedule factor for a respective participant based on the respective participant's availability despite one or more conflicting calendar events comprising scheduled calendar events that conflict with at least one of the candidate calendar events; and
ranking the set of candidate calendar events based on the participant reschedule factor.

30. The computer readable storage medium of claim 24, further including instructions for:
for each of a plurality of respective participants, calculating a participant reschedule factor for the respective participant based on the respective participant's availability despite one or more conflicting calendar events comprising scheduled calendar events that conflict with at least one of the candidate calendar events; and
ranking the set of candidate calendar events based on the participant reschedule factors.

* * * * *

UNITED STATES PATENT AND TRADEMARK OFFICE
CERTIFICATE OF CORRECTION

PATENT NO. : 8,375,034 B2
APPLICATION NO. : 12/726255
DATED : February 12, 2013
INVENTOR(S) : Kenneth S. Norton et al.

It is certified that error appears in the above-identified patent and that said Letters Patent is hereby corrected as shown below:

On the Title page, at Item (60), line 2, please delete "61/298,302" and insert -- 61/298,902 --.

Signed and Sealed this
Ninth Day of April, 2013

Teresa Stanek Rea
*Acting Director of the United States Patent and Trademark Office*